United States Patent [19]
Dillon et al.

[11] Patent Number: 5,968,129
[45] Date of Patent: Oct. 19, 1999

[54] METHOD AND APPARATUS FOR SELECTIVELY RETRIEVING INFORMATION FROM A SOURCE COMPUTER USING A TERRESTRIAL OR SATELLITE INTERFACE

[75] Inventors: Douglas M. Dillon; Vivek Gupta, both of Gaithersburg, Md.

[73] Assignee: Hughes Electronics Corporation, El Segundo, Calif.

[21] Appl. No.: 09/082,626

[22] Filed: May 21, 1998

Related U.S. Application Data

[60] Division of application No. 08/797,505, Feb. 2, 1997, Pat. No. 5,852,721, which is a continuation-in-part of application No. 08/257,670, Jun. 8, 1994, abandoned.

[51] Int. Cl.$^6$ .............................. G06F 13/42; G06F 13/14; H04L 12/66
[52] U.S. Cl. ........................ 709/233; 709/234; 709/239; 370/231; 370/232
[58] Field of Search ................. 395/200.33, 200.79, 395/800.01, 200.54, 200.69, 200.313; 379/106.01, 361, 67; 370/404, 318, 406, 316, 370, 472, 231; 455/38.1, 430, 427; 367/68; 709/235, 234

[56] References Cited

U.S. PATENT DOCUMENTS

| | | | |
|---|---|---|---|
| 4,018,993 | 4/1977 | Edstrom | 310/316 |
| 4,135,156 | 1/1979 | Sanders, Jr. et al. | 325/4 |
| 4,358,672 | 11/1982 | Hyatt et al. | 235/380 |
| 4,538,073 | 8/1985 | Freige et al. | 307/33 |
| 4,599,647 | 7/1986 | George et al. | 358/122 |
| 4,636,879 | 1/1987 | Narita et al. | 360/72.2 |
| 4,663,743 | 5/1987 | Rampuria et al. | 367/68 |
| 4,680,688 | 7/1987 | Inou et al. | 363/21 |
| 4,686,698 | 8/1987 | Tompkins et al. | 348/230 |
| 4,720,873 | 1/1988 | Goodman et al. | 455/2 |
| 4,724,520 | 2/1988 | Athanas et al. | 364/200 |
| 4,736,422 | 4/1988 | Mason | 380/20 |
| 4,768,228 | 8/1988 | Clupper et al. | 380/20 |
| 4,775,974 | 10/1988 | Kobayashi | 370/231 |
| 4,777,657 | 10/1988 | Gillaspie | 455/186 |
| 4,793,813 | 12/1988 | Bitzer et al. | 434/335 |
| 4,802,215 | 1/1989 | Mason | 380/21 |
| 4,829,569 | 5/1989 | Seth-Smith et al. | 380/10 |
| 4,847,892 | 7/1989 | Shelley | 379/93.09 |
| 4,918,653 | 4/1990 | Johri et al. | 364/900 |
| 4,933,936 | 6/1990 | Rasmussen et al. | 370/406 |
| 4,940,963 | 7/1990 | Gutman et al. | 340/313 |
| 4,959,872 | 9/1990 | Imai et al. | 455/164 |
| 5,019,910 | 5/1991 | Filmer | 358/188 |
| 5,029,207 | 7/1991 | Gammie | 380/10 |
| 5,038,265 | 8/1991 | Paladel | 363/65 |

(List continued on next page.)

FOREIGN PATENT DOCUMENTS

| | | |
|---|---|---|
| 0 483 547 | 5/1992 | European Pat. Off. . |
| 62-221228 | 9/1987 | Japan . |
| 5-252087 | 9/1993 | Japan . |
| 6-252896 | 9/1994 | Japan . |

OTHER PUBLICATIONS

Brad Wood, "I Can't Get ISDN. Isn't There Another Way to Get Quick Access to the Web?", PC World, Sep. 1996, pp. 264–265.

*Primary Examiner*—Daniel H. Pan
*Attorney, Agent, or Firm*—John T. Whelan; Michael W. Sales

[57] ABSTRACT

A requesting terminal includes an interface that allows a user to select whether data downloaded from a network (such as the Internet) is transmitted to the requesting terminal via a high-speed link, such as a satellite link, or a lower speed link, such as a terrestrial link. Preferably, the terrestrial link (which may comprise a conventional dial-up Internet connection) is a two-way link, wherein the requesting terminal transmits data requests to the network via the terrestrial link. The data requests generated by the requesting terminal are modified to designate whether the requested data should be downloaded from the network via the terrestrial link or the satellite link. The terrestrial link may also be automatically selected for certain applications.

29 Claims, 12 Drawing Sheets

U.S. PATENT DOCUMENTS

| | | | |
|---|---|---|---|
| 5,058,138 | 10/1991 | Figura et al. | 375/88 |
| 5,101,267 | 3/1992 | Morales-Garza | 358/84 |
| 5,101,478 | 3/1992 | Fu et al. | 710/1 |
| 5,111,504 | 5/1992 | Esserman et al. | 380/21 |
| 5,131,010 | 7/1992 | Derrenge et al. | 375/100 |
| 5,157,662 | 10/1992 | Tadamura et al. | 370/110.1 |
| 5,193,151 | 3/1993 | Jain | 709/237 |
| 5,223,923 | 6/1993 | Morales-Garza | 358/84 |
| 5,237,610 | 8/1993 | Gammie et al. | 380/10 |
| 5,245,429 | 9/1993 | Virginio et al. | 358/142 |
| 5,249,164 | 9/1993 | Koz | 358/21 |
| 5,257,369 | 10/1993 | Skeen et al. | 395/650 |
| 5,293,250 | 3/1994 | Okumura et al. | 358/402 |
| 5,301,358 | 4/1994 | Gaskill et al. | 455/56.1 |
| 5,303,042 | 4/1994 | Lewis et al. | 348/14 |
| 5,309,351 | 5/1994 | McCain et al. | 340/825.06 |
| 5,319,705 | 6/1994 | Halter et al. | 380/4 |
| 5,319,707 | 6/1994 | Wasilewski et al. | 380/14 |
| 5,319,712 | 6/1994 | Finkelstein et al. | 380/44 |
| 5,335,276 | 8/1994 | Thompson et al. | 380/21 |
| 5,337,044 | 8/1994 | Folger et al. | 340/825.44 |
| 5,341,425 | 8/1994 | Wasilewski et al. | 380/20 |
| 5,347,304 | 9/1994 | Moura et al. | 348/12 |
| 5,359,367 | 10/1994 | Stockill | 348/552 |
| 5,367,571 | 11/1994 | Bowen et al. | 380/20 |
| 5,387,994 | 2/1995 | McCormack et al. | 359/159 |
| 5,394,469 | 2/1995 | Nagel et al. | 380/4 |
| 5,394,561 | 2/1995 | Freeburg | 455/13.1 |
| 5,400,401 | 3/1995 | Wasilewski et al. | 380/9 |
| 5,404,505 | 4/1995 | Levinson | 395/600 |
| 5,404,583 | 4/1995 | Lalezari et al. | 455/90 |
| 5,412,660 | 5/1995 | Chen et al. | 370/318 |
| 5,420,866 | 5/1995 | Wasilewski | 370/110.1 |
| 5,452,357 | 9/1995 | Naccache | 380/25 |
| 5,465,213 | 11/1995 | Ross | 364/468 |
| 5,481,609 | 1/1996 | Cohen et al. | 380/16 |
| 5,483,466 | 1/1996 | Kawahara et al. | 364/514 |
| 5,483,595 | 1/1996 | Owen | 380/23 |
| 5,491,800 | 2/1996 | Goldsmith et al. | 709/221 |
| 5,504,814 | 4/1996 | Miyahara | 380/4 |
| 5,506,904 | 4/1996 | Sheldrick et al. | 380/23 |
| 5,526,404 | 6/1996 | Wiedman et al. | 379/60 |
| 5,532,914 | 7/1996 | Kageyama et al. | 363/50 |
| 5,548,753 | 8/1996 | Linstead et al. | 395/600 |
| 5,564,076 | 10/1996 | Auvray | 455/76 |
| 5,568,554 | 10/1996 | Eastlake, 3rd | 380/25 |
| 5,590,200 | 12/1996 | Nachman et al. | 380/46 |
| 5,592,173 | 1/1997 | Lau et al. | 342/357 |
| 5,594,776 | 1/1997 | Dent | 379/58 |
| 5,594,782 | 1/1997 | Zicker et al. | 379/63 |
| 5,627,528 | 5/1997 | Kuznicki | 340/825.44 |
| 5,634,190 | 5/1997 | Wiedeman | 455/13.1 |
| 5,652,795 | 7/1997 | Dillon et al. | 380/25 |

FIG. 10.

| 1030 | 1020 | 1010 |
|---|---|---|
| LLC HEADER | SATELLITE HEADER | IP DATAGRAM (PAYLOAD) |
| DELIVERS PACKET TO SATELLITE GATEWAY STRIPPED OFF IN SATELLITE GATEWAY | USED TO ID CORRECT RECEIVER TERMINAL STRIPPED OFF IN BIC DRIVER IN USER TERMINAL | DESTINED FOR TCP/IP PACKAGE IN USER TERMINAL |

FIG. 11.

```
   0      4       10       16        24         31
1102 | SOURCE PORT        | DESTINATION PORT   |
     |         SEQUENCE NUMBER                 |
1104 |       ACKNOWLEDGEMENT NUMBER            |
     | HLEN | RESERVED | CODE BITS | WINDOoW   |
1106 |     CHECKSUM     |   URGENT POINTER     |
     |      OPTIONS (IF ANY)      | PADDING    |
     |              DATA                       |
     |              ...                        |
                  TCP PACKET
```

| DA = application server | SA = satellite interface | IP header checksum | TCP/UDP checksum | Request Data |

FIG. 16A: ORIGINAL REQUEST PACKET

| new DA = hybrid gateway | new SA = SLIP provider | new IP header checksum | DA = application server | SA = satellite interface | IP header checksum | TCP/UDP checksum | Request Data |

FIB. 16B: TUNNELED SATELLITE REQUEST PACKET

| DA = application server | (new) SA = SLIP provider | (new) IP header checksum | (new) TCP/UDP checksum | Request Data |

FIG. 16C: TERRESTRIAL REQUEST PACKET

| DA = SLIP provider | SA = application server | IP header checksum | TCP/UDP checksum | Request Data |

FIG. 16D: TERRESTRIAL REPLY PACKET

| (new) DA = satellite interface | SA = application server | IP header checksum | TCP/UDP checksum | Request Data |

FIG. 16E: MODIFIED TERRESTRIAL REPLY PACKET

METHOD AND APPARATUS FOR SELECTIVELY RETRIEVING INFORMATION FROM A SOURCE COMPUTER USING A TERRESTRIAL OR SATELLITE INTERFACE

RELATED APPLICATIONS

This application is a divisional of U.S. patent application Ser. No. 08/797,505, filed on Feb. 2, 1997, now U.S. Pat. No. 5,852,721, which is a continuation-in-part of U.S. patent application Ser. No. 08/257,670, filed Jun. 8, 1994, now abandoned.

BACKGROUND OF THE INVENTION

This application relates to a computer network and, more specifically, to a method and apparatus for allowing both high-speed and regular-speed access to a computer network.

The Internet is an example of a TCP/IP network. The Internet has over 10 million users. Conventionally, access to the Internet is achieved using a slow, inexpensive method, such as a terrestrial dial-up modem using a protocol such as SLIP (Serial Line IP), PPP, or by using a fast, more expensive method, such as a switched 56 Kbps, frame relay, ISDN (Integrated Services Digital Network), or T1.

Users generally want to receive (download) large amounts of data from networks such as the Internet. Thus, it is desirable to have a one-way link that is used only for downloading information from the network. A typical user will receive much more data from the network than he sends. Thus, it is desirable that the one-way link be able to carry large amounts of data very quickly. What is needed is a high bandwidth one-way link that is used only for downloading information, while using a slower one-way link to send data into the network.

Currently, not all users have access to high speed links to networks. Because it will take a long time to connect all users to networks such as the Internet via physical high-speed lines, such as fiber optics lines, it is desirable to implement some type of high-speed line that uses the existing infrastructure.

Certain types of fast network links have long propagation delays. For example, a link may be transmitting information at 10 Mbps, but it may take hundreds of milliseconds for a given piece of information to travel between a source and a destination on the network. In addition, for even fast low-density links, a slow speed return-link may increase the round trip propagation time, and thus limit throughput. The TCP/IP protocol, as commonly implemented, is not designed to operate over fast links with long propagation delays. Thus, it is desirable to take the propagation delay into account when sending information over such a link.

SUMMARY OF THE INVENTION

A first embodiment of the present invention overcomes the problems and disadvantages of the prior art by allowing a user to download data using a fast one-way satellite link, while using a conventional low-speed Internet connection for data being sent into the network.

A second embodiment of the present invention allows a user to specify for certain applications that data be downloaded from the Internet via a terrestrial link, rather than the satellite link.

According to one aspect of the present invention, a system for retrieving data from a source computer coupled to a network comprises a low-speed path linking a requesting terminal with the network, a high-speed path linking the requesting terminal with the network, and means for selecting either the low-speed path or the high-speed path for transmission of data from the source computer to the requesting terminal. In a preferred embodiment, the low-speed path is a terrestrial link, wherein the terrestrial link is a two-way link between the requesting terminal and the network comprising a serial port in the requesting terminal in communication with a SLIP provider connected to the network. The high-speed path is a satellite link, wherein the satellite link is a one-way link comprising a gateway connected to the network wherein data retrieved from the source computer is provided to the gateway via the network and transmitted to the requesting terminal via the satellite link. The requesting terminal generates a data request packet that is sent to the source computer via the terrestrial link. The selection means comprises a driver in the requesting terminal that modifies the request packet to specify either the low-speed path or the high-speed path. The selection means may also include a user interface in the requesting terminal that allows a user to specify that certain applications use the low-speed path.

According to another aspect of the present invention, a system for retrieving data from a source computer coupled to a network comprises a requesting terminal for requesting data to be retrieved from the source computer. The requesting terminal includes a terrestrial interface coupled to the network, and a satellite interface capable of receiving data transmitted via satellite link, wherein the satellite link includes a gateway coupled to the network. The requesting terminal further includes means for designating that the requested data be transmitted from the source computer to the requesting terminal through either the terrestrial interface or the satellite interface.

According to yet another aspect of the present invention, a method of retrieving data from a source computer coupled to a network comprises the steps of generating, at a requesting terminal, a request packet for transmission of data from the source computer, designating, at the requesting terminal, a transmission path selected from either a low-speed path (such as a terrestrial link) or a high-speed path (such as a satellite link) for transmission of the requested data from the source computer to the requesting terminal, providing the designated data request to the source computer, wherein the source computer generates a data reply, and receiving the data reply from the source computer via the designated transmission path.

Objects and advantages of the invention will be set forth in part in the description which follows and in part will be obvious from the description or may be learned by practice of the invention. The objects and advantages of the invention will be realized and attained by means of the elements and combinations particularly pointed out in the appended claims.

BRIEF DESCRIPTION OF THE DRAWINGS

The accompanying drawings, which are incorporated in and constitute a part of this specification, illustrate several embodiments of the invention and, together with the description, serve to explain the principles of the invention.

FIG. 10 is a diagram showing a format of packets sent to a satellite gateway of FIG. 1;

FIG. 11 is a diagram showing a TCP packet format;

FIGS. 16A–16E are diagrams of the data packets represented in FIG. 16.

DETAILED DESCRIPTION OF THE PREFERRED EMBODIMENTS

Reference will now be made in detail to the preferred embodiments of the invention, examples of which are illustrated in the accompanying drawings. Wherever possible, the same reference numbers will be used throughout the drawings to refer to the same or like parts.

I. SATELLITE LINK

According to a first embodiment of the present invention, all information downloaded from the Internet is received via a high speed satellite link, as described in detail below.

a. General Overview

A preferred embodiment of the present invention uses satellite technology to implement a high-speed one-way link between a user's computer and a TCP/IP network, such as the Internet or a private TCP/IP network. This high-speed link is used to download data from the network. The user's computer also has a conventional TCP/IP link for sending data to the network. The invention can use various forms of high-speed, one-way links, such as satellites and cable television lines. The invention can use various forms of low-speed networks, such as TCP/IP networks, dialup telephones, ISDN D-channel, CPDP, and low-speed satellite paths.

The described embodiment of the present invention uses satellites to provide a high-speed one-way link. Satellites can cover large geographical areas and are insensitive to the distance between a transmitter and a receiver. In addition, satellites are very efficient at point-to-point and broadcast applications, and are resilient and resistant to man-made disasters. Two-way satellites are expensive to use, however, because of the costs involved in purchasing and installing the satellite earth station hardware. In the past, these costs have placed satellite communications outside the reach of the consumer.

The present invention allows a personal computer to receive downloaded information from the network via a satellite at a very practical cost. In the present invention, the cost of satellite communications is reduced because a one-way satellite link is used. Receive-only earth station equipment is cheaper to manufacture because it requires less electronics than send/receive antennae.

As is well-know in the art, communication over the Internet and similar TCP/IP networks is achieved through a group (suite) of protocols called Transmission Control Protocol/Internet Protocol (TCP/IP). The TCP/IP protocol is described in the book "Internetworking With TCP/IP, VOL I" by Douglas Comer, published by Prentice-Hall, Inc., of Englewood Cliffs, N.J., 1991.

b. Hybrid TCP/IP Access

Figure 1:
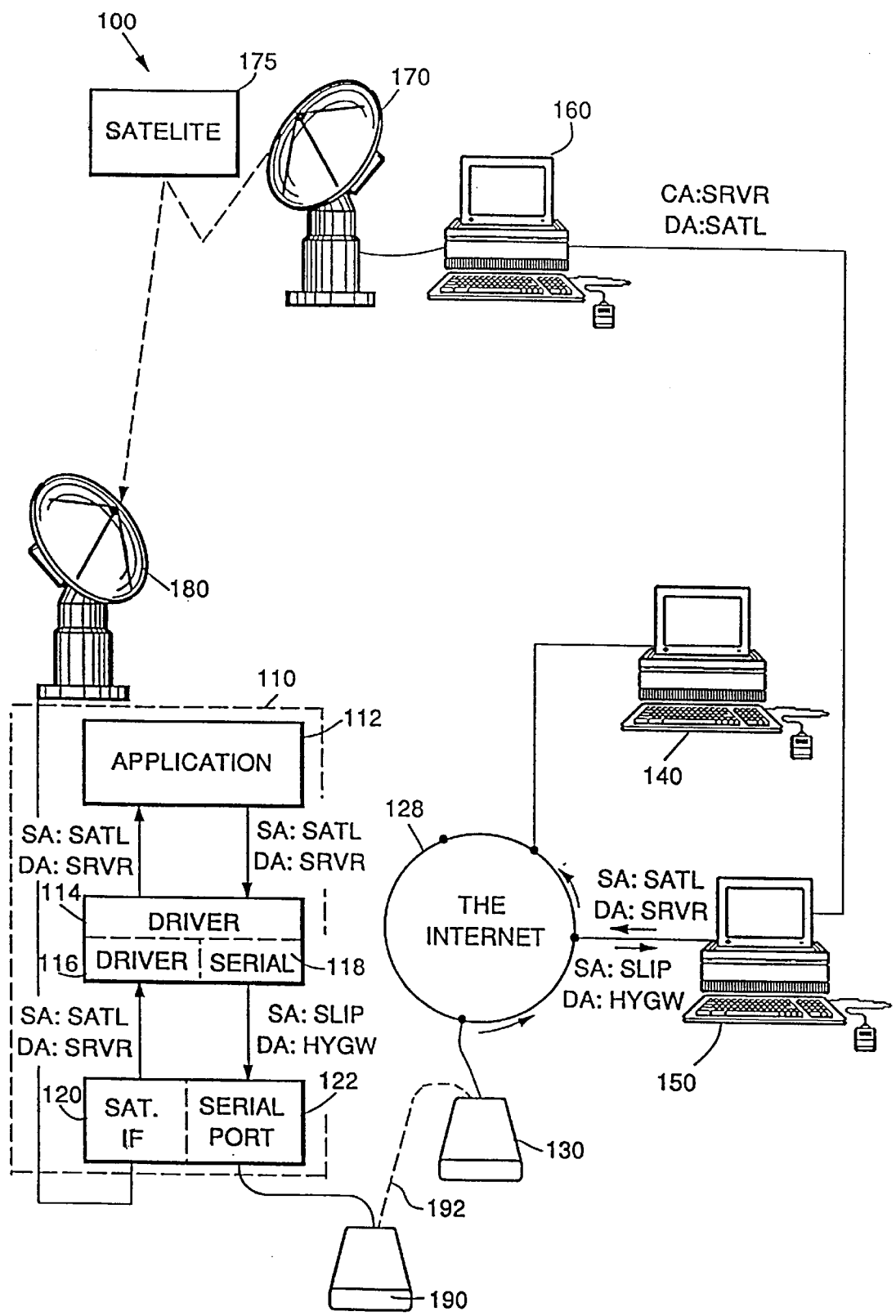
FIG. 1 is a hardware block diagram of a preferred embodiment of the invention.

FIG. 1 is a hardware block diagram of a preferred embodiment of the invention. FIG. 1 includes five subsystems: a hybrid terminal 110, a SLIP provider (Internet connection) 130, an application server 140, a hybrid gateway 150, and a satellite gateway 160. Hybrid terminal 110 is connected to a modem 190, e.g., a 9600 baud modem, which connects to SLIP provider 130 through a telephone line 192. A satellite transmitter 170, a satellite 175, and a satellite receiver 180 provide a fast, one-way link for transferring data from satellite gateway 160 to hybrid terminal 110. Satellite transmitter 170, satellite 175 and satellite receiver 180, however, do not themselves necessarily comprise a part of the present invention. Each of SLIP provider 130, application server 140, and hybrid gateway 150 are connected to the Internet 128. As is well-known in the art, the Internet 128 is a "network of networks" and can be visually depicted only in general terms, as seen in FIG. 1.

Each of hybrid terminal 110, SLIP provider 130, application server 140, hybrid gateway 150 and satellite gateway 160 preferably includes a processor (not shown) that executes instructions stored in a memory (not also shown). Other parts of the invention may also include processors that are not discussed herein, such as I/O processors, etc. Preferably, hybrid terminal 110, hybrid gateway 150, and satellite gateway 160 are implemented as personal computers including an 80386/80486 or Pentium based personal computer operating at least 33 MHz, but these elements can be implemented using any data processing system capable of performing the functions described herein. Alternatively, the functionality of both hybrid gateway 150 and satellite gateway 160 could be performed in a single gateway unit (not shown) without departing from the spirit or scope of the present invention. In the described embodiment, SLIP provider 130 is a conventional SLIP provider and application server 140 is any application server that can connect to the Internet 128 via TCP/IP.

As shown in FIG. 1, hybrid terminal 110 preferably also includes application software 112, driver software 114, a serial port 122 for connecting hybrid terminal 110 to modem 190, and satellite interface hardware 120 for connecting hybrid terminal 110 to satellite receiver 180.

Figure 2:
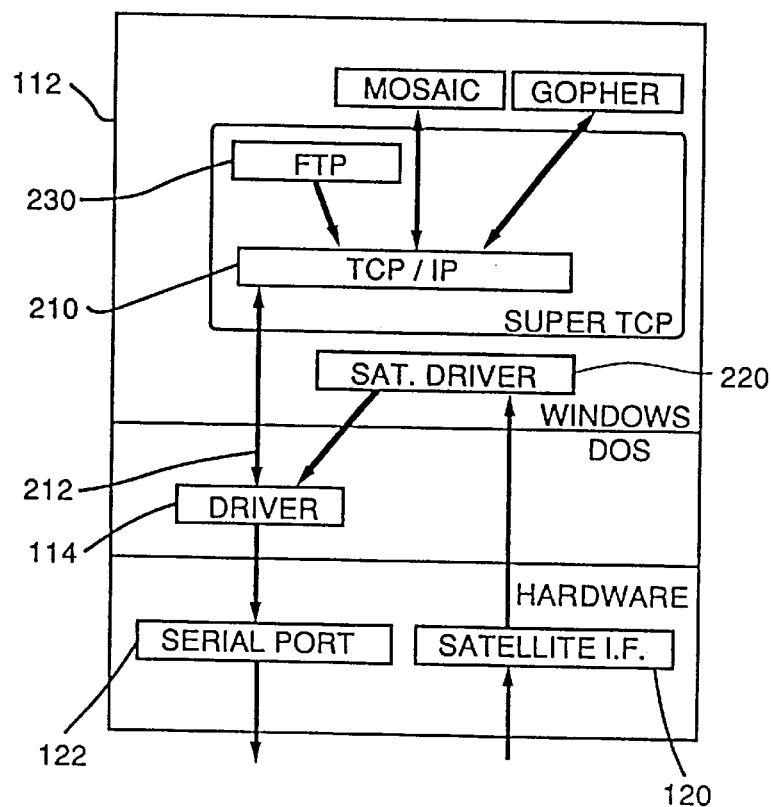
FIG. 2 is a diagram of a portion of a hybrid terminal of FIG. 1.

FIG. 2 shows a relationship between software in application 112, software in driver 114, serial port 122, and satellite interface 120. Application software 112 preferably includes TCP/IP software, such as SuperTCP, manufactured by Frontier, Inc., Chameleon, manufactured by Netmanager, and IRNSS, manufactured by SPRY, Inc. The described embodiment preferably operates with the SuperTCP TCP/IP package and, thus, uses a standard interface 212 between the TCP/IP software 210 and driver 114. Examples of standard interface 212 between TCP/IP software 210 and driver 114 include the Crynson-Clark Packet Driver Specification and the 3Com/Microsoft Network Driver Interface Specification (NDIS). Other embodiments within the scope of the invention may use other standard or non-standard interfaces between TCP/IP software 210 and driver 114.

As shown in FIG. 2, application software 112 preferably also includes well-know Internet utilities, such as FTP 230, and well-known user interfaces, such as Mosaic and Gopher (shown). Application software 112 can also include other utilities, e.g., News and Archie (not shown).

The following paragraphs describe how a request from hybrid terminal 110 is carried through the Internet 128 to application server 140 and how a response of application server 140 is carried back to the user at hybrid terminal 110 via the satellite link. (As used herein, the term "satellite link" refers to any portion of the path between application server 140, the Internet 128, satellite gateway 160, satellite transmitter 170, satellite 175, satellite receiver 180 and hybrid terminal 110). The operation of each subsystem will be described below in detail in separate sections.

In the present invention, hybrid terminal 110 is given two IP addresses. One IP packet address corresponds to SLIP provider 130 and is assigned by a SLIP service provider. The other IP address corresponds to satellite interface 120 and is assigned by a hybrid service provider. IP addresses are assigned by the SLIP and satellite network managers and loaded into hybrid terminal 110 as part of an installation configuration of the hybrid terminal's hardware and software. These two IP interface addresses correspond to completely different physical networks. SLIP provider 130 does not "know" anything about the satellite interface IP address or even whether the user is using the satellite service. If a host somewhere in the Internet is trying to deliver a packet to the satellite IP address by using the Internet routing scheme of routers, gateways, and ARPs (Address Resolution Protocol), the only way that the packet can reach the satellite interface IP is to traverse the satellite by being routed through satellite gateway 160.

The following example assumes that a user at hybrid terminal 110 desires to send a request to a remote machine, such as application server 140 that is running FTP (File Transfer Protocol) server software. The FTP software running on application server 140 receives file transfer requests and responds to them in an appropriate fashion.

Figure 3:
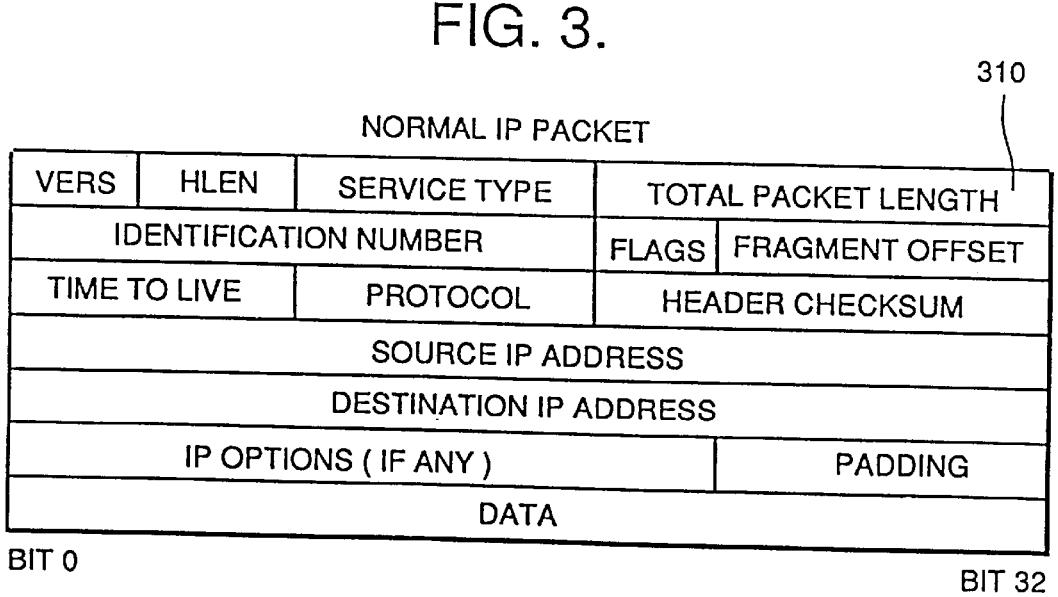
FIG. 3 is a diagram showing an IP packet format.

FIG. 3 shows the contents of a source field (SA) and of a destination field (DA) of packets sent between the elements of FIG. 1. A request for a file and a response of a file sent from application server 140 to hybrid terminal 110 may take the following path.

Figure 4:
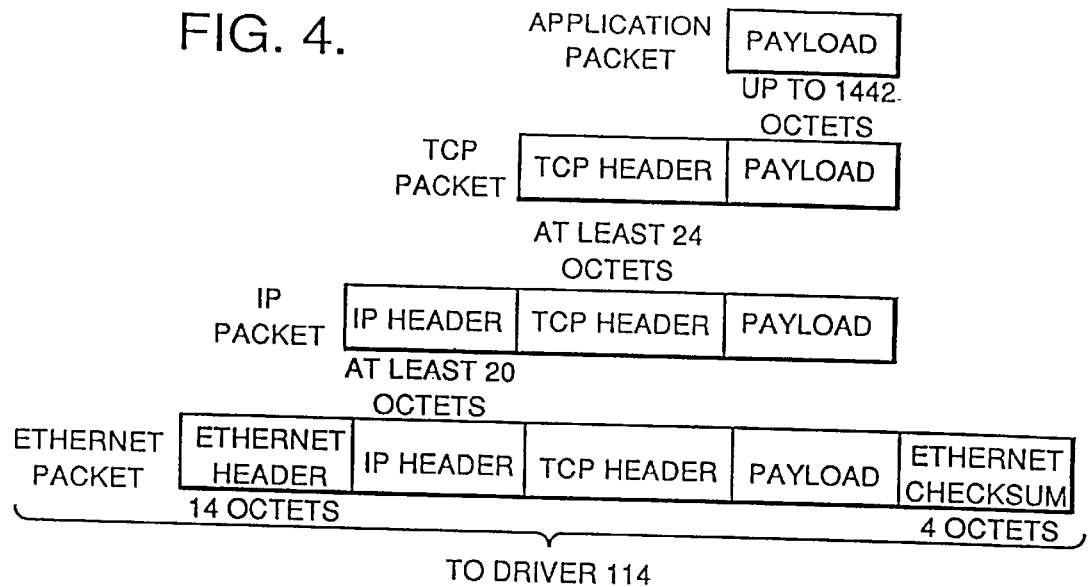
FIG. 4 is a diagram showing a plurality of packet formats, including an Ethernet packet format.

1) Within hybrid terminal 110, FTP client software 230 generates a request and passes it to TCP/IP software 210. TCP/IP software 210 places the request in a TCP packet (see FIG. 11). Next, the TCP packet is placed in an IP packet, having a format shown in FIG. 3. TCP/IP software 210 places the IP packet in an Ethernet packet, as shown in FIG. 4, and passes the Ethernet packet to driver 114. This packet has a source IP address corresponding to satellite interface 120 and a destination IP address of application server 140. Ethernet is a packet switching protocol standardized by Xerox Corporation, Intel Corporation, and Digital Equipment Corporation, which is described in "The Ethernet" A Local Area Network Data Link Layer and Physical Layer Specification," September 1980, which is available from any of these three companies, and which is incorporated by reference.

Figure 5:
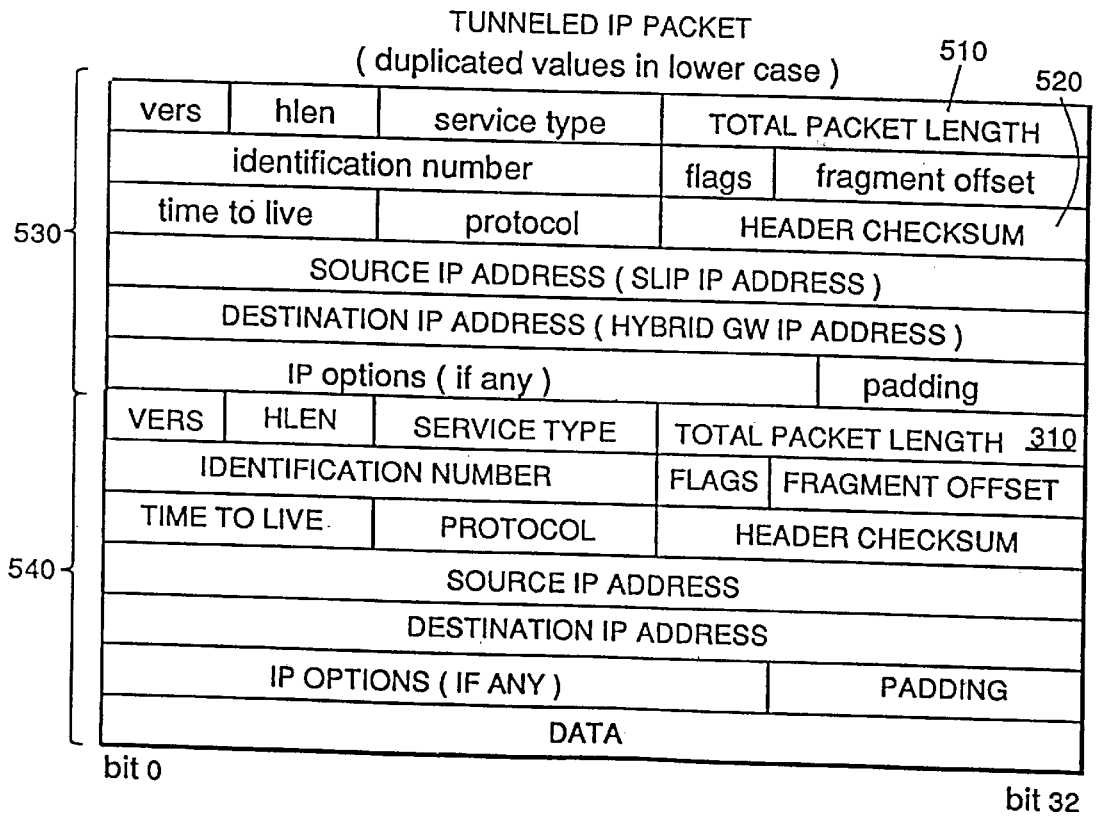
FIG. 5 is a diagram showing a tunneling packet format.
Figure 7:
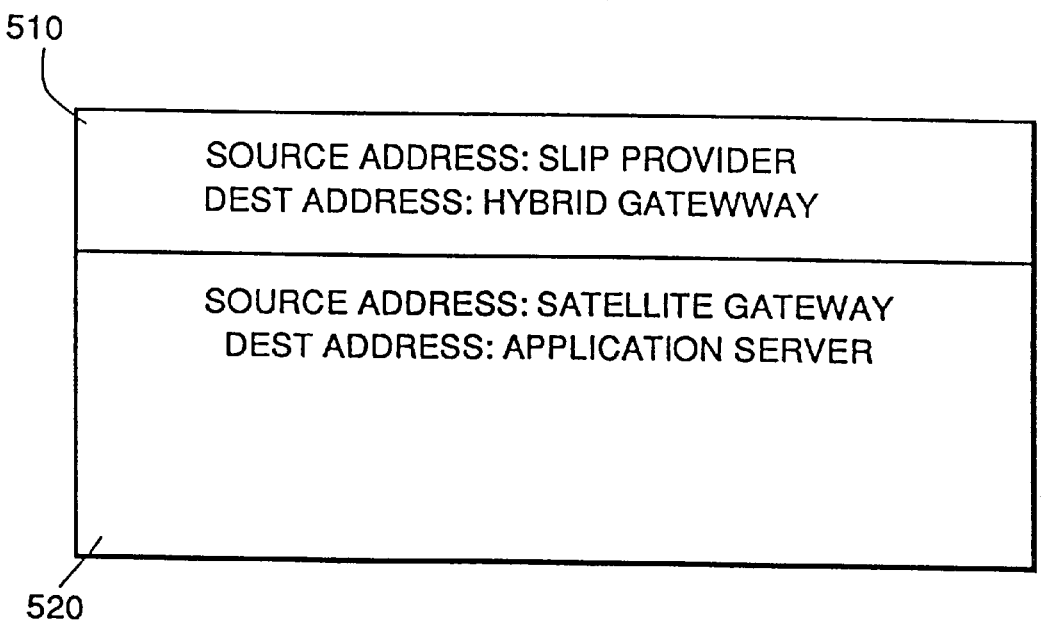
FIG. 7 is a diagram showing an example of partial data in a tunneling packet.

2) In driver 114, the Ethernet header and checksum are stripped off the packet and the IP packet is encapsulated, or "tunneled," inside of another IP packet, and sent over serial port 122 to SLIP provider 130. FIG. 5 shows a format of a tunneled packet. FIG. 7 shows an example of a tunnelled packet. The encapsulation adds a new IP header 530 in front of the original packet 540 with a source address corresponding to SLIP provider 130 and a destination address corresponding to hybrid gateway 150.

3) SLIP provider 130 receives the IP packet, analyzes the tunneling header and, thinking it is destined for hybrid gateway 150, uses standard Internet routing to send the packet to hybrid gateway 150.

3) When hybrid gateway 150 receives the packet, it strips off the tunneling header, revealing the true header with application server 140 as the destination. The packet is then sent back out into the Internet 128.

5) Internet routing takes the packet to application server 140, which replies with the requested file and addresses the reply to the request's source IP address, i.e., the IP address of the hybrid terminal's satellite interface 120.

6) In order to find the hybrid terminal's satellite interface 120, the Internet routing protocol will send the packet to the subnet containing a router/gateway connected to hybrid gateway 150. When a router on the same physical network as satellite gateway 160 and hybrid gateway 150 sends out an ARP for the IP address of satellite interface 120 (to find a physical address of satellite interface 120), hybrid gateway 150 responds and says "send it to me." Thus, application server 140 and the rest of the Internet 128 think that packets sent to hybrid gateway 150 will reach the hybrid terminal's satellite interface.

7) Once hybrid gateway 150 receives a reply packet from application server 140, it sends it to satellite gateway 160. In the described embodiment, hybrid gateway 150 encapsulates the packet in a special packet format that is used over the satellite link and uses the satellite interface IP address to uniquely identify the satellite packet's destination. Then hybrid gateway 150 sends the packet over the Ethernet to satellite gateway 160.

8) Satellite gateway 160 broadcasts over the satellite link any packets it receives from hybrid gateway 150.

9) Driver 114 in hybrid terminal 110 that services satellite interface 120 scans all packets broadcast over satellite transmitter 170 looking for its satellite interface IP address in the header. Once it identifies one, it captures it, strips off the satellite header revealing the reply IP packet, and sends it to driver 114.

Thus, IP packets sent into Internet 128 are carried by the SLIP connection, while IP packets from the Internet 128 are carried by the satellite link. The following paragraphs describe the operation of each subsystem in more detail.

1. The Hybrid Terminal

Hybrid terminal 110 is the terminal with which the user interacts. Thus, hybrid terminal 110 preferably includes a user interface device (not shown) such as a mouse, keyboard, etc. As shown in FIG. 1, hybrid terminal 110 includes one or more application programs 112 (including TCP/IP software 210), and driver software 114, which communicates with SLIP provider 130 through a serial port 122 and modem 190, using a serial driver portion 118, and which communicates with satellite receiver 180 through a satellite interface 120, using a driver portion 116.

To TCP/IP software 210, driver 114 appears to be an Ethernet card, although driver 114 is actually connected to satellite receiver 180 (via satellite interface 120) and to SLIP provider 130 (via serial line 122 and modem 190, respectively). Thus, TCP/IP software 210 believes that it is communicating with a single physical network, when it is, in reality, communicating with two physical networks (the SLIP dial up network and a satellite network).

Figure 6:
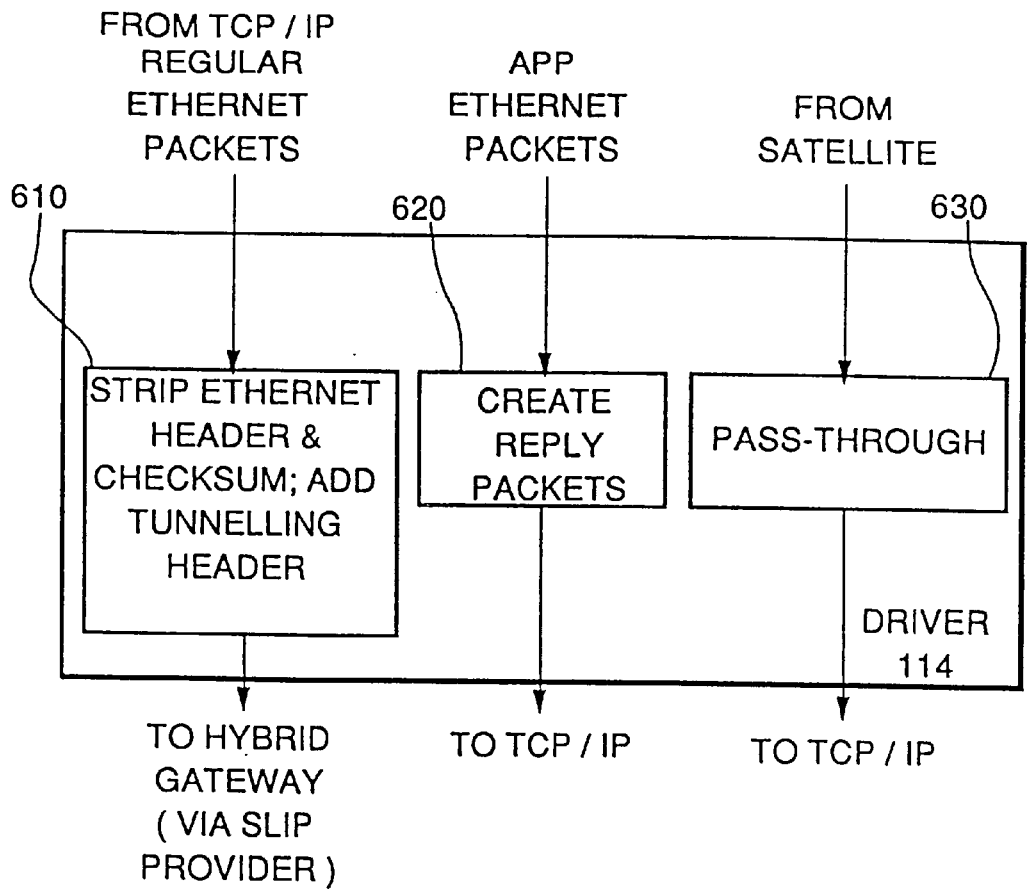
FIG. 6 is a diagram of steps performed by the hybrid terminal of FIG. 1.

FIG. 6 is a diagram of steps performed by driver 114 of hybrid terminal 110 of FIG. 1. As shown in FIG. 6, driver 114 receives packets of data from TCP/IP software 210 and passes them to SLIP provider 130 via serial port 122 and modem 190. A packet sent by application server 140 is received through satellite receiver 180, passed through the satellite interface 120, passed to the satellite driver 220, and passed to driver 114, which passes the received packet to TCP/IP software 210.

The following paragraphs discuss two basic functions performed by driver 114 (tunneling and ARP handling) and discuss various implementation details for the preferred embodiment.

A. "Tunnelling"

As discussed above, hybrid terminal 110 has two IP addresses associated with it: one for SLIP provider 130 and one for the satellite interface 120. Packets containing requests are sent from hybrid terminal 110 to application server 140 via the Internet 128, while packets containing a reply are sent back via the satellite link. Tunneling is the method by which application server 140 is "fooled" into sending a reply to a different IP address (satellite interface 120) than that of the sender (serial port 122).

A packet received by driver 114 from the TCP/IP software 210 has a source address of satellite gateway 160 and a destination address of application server 140. As shown in step 610 of FIG. 6, driver 114 removes the Ethernet header and checksum and encapsulates the IP header into an IP tunnelling header having a source address of SLIP provider 130 and a destination address of hybrid gateway 150 (see FIG. 7). As described above, at hybrid gateway 150, the tunnelling header is removed and the packet is sent back into the Internet 128 to be sent to application server 140.

When forming a tunneling header, driver 114 copies all the values from the old header into the new one with the following exceptions. The source and destination addresses of the tunneling header change, as described above. In addition, a total packet length field 510 is changed to contain the contents of length field 310 plus the length of the tunnelling header. Lastly, the driver 114 recalculates checksum 520 of the tunneling header because some of the fields have changed.

B. ARP Handling

ARP (Address Resolution Protocol) is used by TCP/IP to dynamically bind a physical address, such as an Ethernet address, to an IP address. When TCP/IP finds an IP address for which it does not know a physical address, TCP/IP broadcasts an ARP packet to all nodes, expecting a response that tells TCP/IP what physical address corresponds to the IP address.

During initialization, driver 114 declares to TCP/IP software 210 that driver 114 is an Ethernet card to ensure that the packets that TCP/IP package sends are Ethernet packets and that the TCP/IP package will be prepared to receive packets at a high-rate of speed. As shown in step 620 of FIG. 6, when driver 114 detects that TCP/IP has sent an ARP packet, driver 114 creates a physical address and sends a reply packet to TCP/IP software 210. The contents of the physical address are irrelevant, because driver 114 strips off the Ethernet header on packets from TCP/IP before the packets are sent to SLIP provider 13.

C. Other Functions

As shown in step 630 of FIG. 6, packets received by driver 114 from satellite receiver 180 (via satellite driver 114) are passed to TCP/IP software 210. The following paragraphs discuss implementation details for the described embodiment.

In a preferred embodiment, TCP/IP software 210 (e.g., Frontier's SuperTCP) sends an ACK (acknowledge) for every packet it receives, even though this action is not required by the TCP/IP protocol. In this situation, many packets compete for the slow link to SLIP provider 130. In TCP/IP, the ACK scheme is cumulative. This means that when a transmitter receives an ACK stating that the receiver has received a packet with sequence number N, then the receiver has received all packets with sequenced numbers up to N as well, and there is no reason why every packet needs to be ACK'ed.

Figure 8:
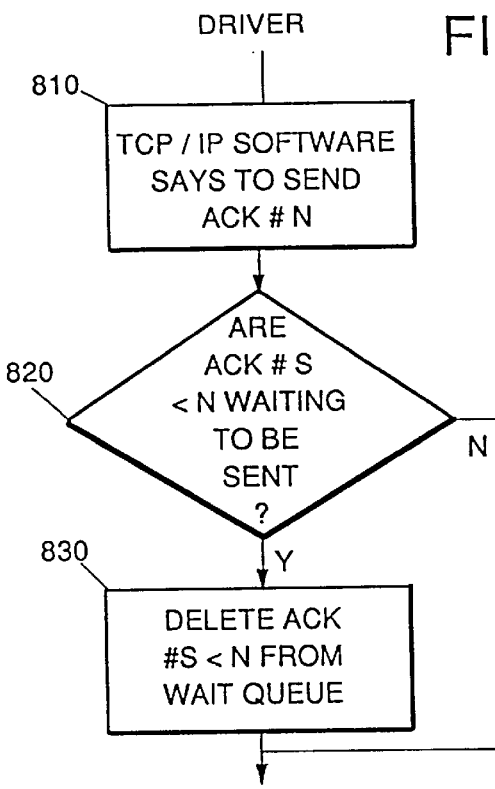
FIG. 8 is a flowchart of steps performed by the hybrid terminal of FIG. 1.

FIG. 8 is a flowchart of steps performed in a preferred embodiment by driver 114 of hybrid terminal 110. FIG. 11 is a diagram showing a preferred TCP packet format. FIG. 11 includes a sequence number field 1102, an acknowledgment (ACK) number field 1104, and a checksum field 1106. In step 810 of FIG. 8, driver 114 receives an ACK packet with sequence number N from TCP/IP software 210. The packet is queued along with other packets waiting to be sent to SLIP provider 130. In step 820 driver 114 checks to determine whether there is a "run" of sequential packets waiting to be sent. If so, in step 830, driver 114 deletes ACK packets for the same TCP connection that have sequence numbers in the run from the queue and sends an ACK only for the highest sequence number in the run. This action alleviates the bottleneck caused by the relatively slow modem speeds.

Serial port 122 provides a physical connection to modem 190 and, through it, to the terrestrial network via a SLIP protocol as described below in connection with SLIP provider 130. Serial data is sent and received through an RS-232 port connector by a UART (Universal Asynchronous Receiver Transmitter), such as a U8250, which has a one byte buffer and is manufactured by National Semiconductor, or a U16550, which has a 16 byte buffer and is also manufactured by National Semiconductor.

The invention preferably operates under the DOS operating system and Windows, but also can operate under other operating systems.

Satellite driver software 220 receives packets from satellite 180, and passes them to driver 114 using a DOS call. Thus, the two physical links are combined within driver 114 and the existence of two physical links is transparent to TCP/IP software 210. Satellite driver 220 scans all packets transmitted over the satellite channel for a packet with a header corresponding to the IP address of the satellite interface 122, performs some error detection and correction on the packet, buffers the received packet, and passes the packet to driver 114 using a DOS call, e.g., IOCTL-output-cmd( ). Driver 114 copies data from satellite driver 220 as quickly as possible and passes it to TCP/IP software 210.

As discussed above, TCP/IP software 210 is fooled into thinking that it is connected to an Ethernet network that can send and receive at 10 Mbps. This concept is helpful on the receive side because data from the satellite is being received at a high rate. On the transmit side, however, modem 190 is not capable of sending at such a high rate. In addition, TCP/IP software 210 sends Ethernet packets to driver 114, i.e., an IP packet is encapsulated into an Ethernet packet. Because SLIP provider 130 expects IP packets, driver 114 must strip the Ethernet header before the packet is sent to SLIP provider 130.

As described above in connection with FIG. 8, driver 114 also includes a transmit and receive queue. As data is received from TCP/IP software 210 and received from the satellite driver 220, it is buffered within the queue. When the queue is full, e.g., when TCP/IP is sending packets faster than modem 190 can send them, driver 114 drops the packets and returns an error so that TCP/IP software 210 will decrease its rate of transmission.

In a first preferred embodiment, a SLIP connection is initiated with an automatic logon procedure. In another preferred embodiment, driver 114 executes instructions to allow a user to perform a SLIP logon manually.

Because TCP/IP software 210 preferably is configured to talk to the Ethernet and it is desirable to receive the largest packet size possible, driver 114 configures TCP/IP so that the MTU (Maximum Transmission Unit) of the network is as large as possible, e.g., 1500 bytes. Some SLIP providers 130 have a smaller MTU, e.g., 512 bytes. To handle the disparity in size, driver 114 segments large packets received from TCP/IP software 210 into segments the size of the SLIP MTU. Once a packet is segmented, it is reassembled in hybrid gateway 150. Only the tunnelling header is copied as the header of the segments.

2. The SLIP Provider

SLIP provider 130 performs the function of connecting hybrid terminal 110 to the Internet 128. As described above, other protocols, such as PPP (point to point protocol), could also be used to perform the connecting function. SLIP server 130 receives SLIP encoded IP packets from modem 190, uncodes them, and forwards them to hybrid gateway 150 via the Internet 128.

In its most basic form, SLIP provider 130 delimits IP packets by inserting a control character such as hex 0×C0-SLIP between them. To insure that a data byte is not mistaken for the control character, all outgoing data is scanned for instances of the control character, which is replaced by a two character string. The SLIP protocol is described in detail in J. Romkey, "A Nonstandard for Transmission of IP Datagrams over Serial Lines: SLIP," RFC 1055, June 1988, pp. 1–6.

3. The Application Server

Application server 140 is a computer system running any combination of known application programs available on the Internet 128 using the TCP/IP protocol suite. For example, application server 140 may transfer files to requesting users via FTP. In this regard, application server 140 may be thought of as a host computer. Although hybrid terminal 110 actually has two IP addresses (a serial port address and an address for the satellite interface), the software executing on application server 140 thinks that it is receiving requests over the satellite network and sending responses over the satellite network. Hybrid terminal 110 is completely transparent to application server 140.

4. The Hybrid Gateway

Although only one hybrid terminal 110 is shown in FIG. 1, the invention can include a plurality of hybrid terminals 110. Preferably, all packets sent from all hybrid terminals 110 pass through hybrid gateway 150 to get untunnelled. Thus, hybrid gateway 150 is a potential system bottleneck. Because of this potential bottleneck, the functions of hybrid gateway 150 are as simple as possible and are performed as quickly as possible. Hybrid gateway 150 also has good Internet connectivity to minimize the accumulated delay caused by packets waiting to be processed by hybrid gateway 150.

A. Untunnelling

Figure 9:
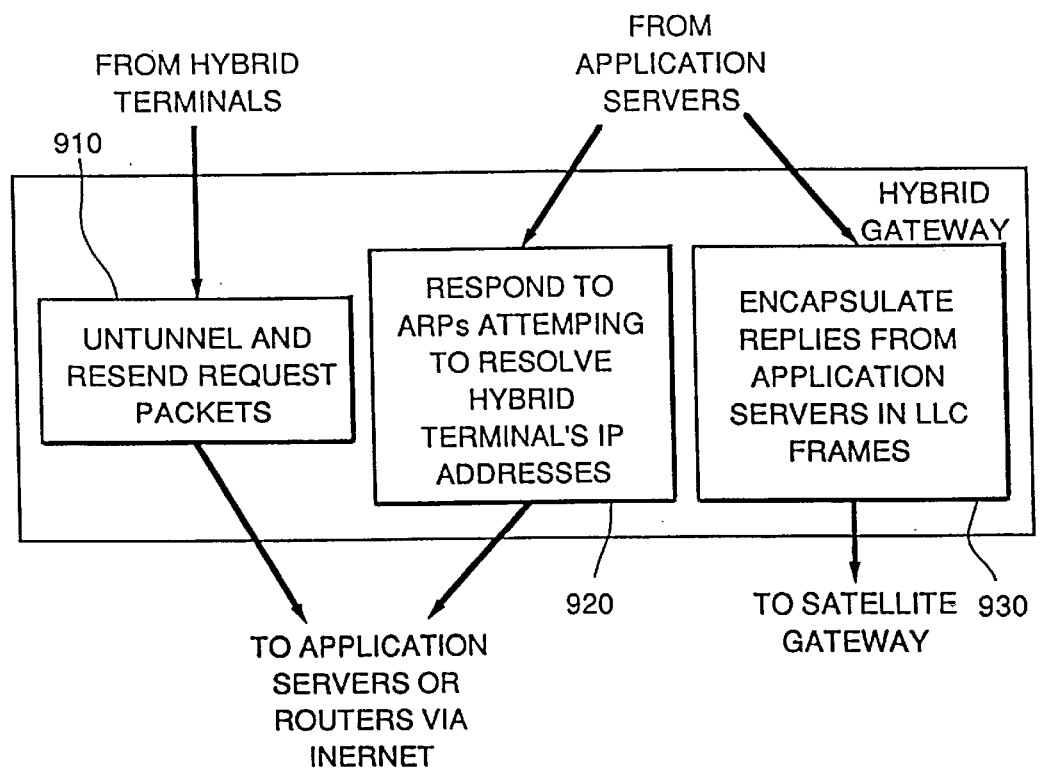
FIG. 9 is a diagram of steps performed by a hybrid gateway of FIG. 1.

FIG. 9 is a diagram of steps performed by hybrid gateway 150 of FIG. 1. In step 910, hybrid gateway 150 receives a tunnelled packet having a format shown in FIG. 5. Hybrid gateway 150 "untunnels" the packet by stripping off the tunnelling header and passes the packet back to the Internet 128.

As described above, packets are sometimes broken into segments when they are sent in order to accommodate a small MTU of SLIP provider 130. Packets may also be segmented as they pass through other elements of the Internet 128 having small MTUs. For fragmented packets, only the tunnelled header is copied into the header of each segment. Hybrid gateway 150 stores fragmented packets in a memory (not shown) and reassembles them in order before untunnelling the original packet and passing it to the Internet 128. Preferably, a "time to live" value is assigned to each packet when it is sent by driver 114 and if all segments do not arrive before a time to live timer expires, the packet is discarded.

B. ARP Responding

Preferably, satellite gateway 160 is on a same physical network as hybrid gateway 150. As shown in step 920 of FIG. 9, when a router on the same physical network as satellite gateway 160 and hybrid gateway 150 sends out an ARP for the IP address of satellite gateway 160 (to find a physical address of satellite gateway 160), hybrid gateway 150 responds and says "send it to me." Hybrid gateway 150 needs to intercept packets intended for satellite gateway 160 because it needs to encapsulate packets for satellite gateway 160 as follows.

C. Satellite Packetizing

The following paragraphs describe how packets travel from application server 140 through hybrid gateway 150 and to satellite gateway 160. The following explanation is given by way of example and is not intended to limit the scope of the present invention. As shown in step 930 of FIG. 9, hybrid gateway 150 encapsulates replies from application server 140 into a satellite packet format. FIG. 10 is a diagram showing a format of a satellite packet sent to satellite gateway 160 of FIG. 1. A satellite packet includes the data 1010 of an original IP packet and two headers 1020, 1030 added by hybrid gateway 150.

Satellite gateway 160 expects IP packets to be encapsulated first in a special satellite packet and then within an LLC-1 IEEE 802.2 link level control, type 1 packet. Satellite header 1020 identifies the downlink and contains a sequence number and the packet length. An LLC-1 header 1030 preferably is used to send the packet to satellite gateway 160, in an Ethernet LAN. Hybrid gateway 150 prepares packets for satellite gateway 160 by appending headers 1020 and 1030 to the front of an IP packet 1010.

The receiver in hybrid terminal 110 does not receive the LLC-1 header 1030. Hybrid terminal 110 identifies packets intended for it by checking a least significant byte in the satellite IP address. Thus, a six byte satellite destination address is determined by reversing an order of bytes of the satellite IP address for hybrid terminal 110 and then padding the rest of the address with zeroes.

5. The Satellite Gateway

Satellite gateway 160 can include any combination of hardware and software that connects satellite transmitter 170 to hybrid gateway 150. Satellite transmitter 170 and satellite receiver 180 can be any combination of hardware and software that allows data to be transmitted by satellite transmitter 170 and received by satellite receiver 180, and to be input to hybrid terminal 110. For example, satellite gateway 160 preferably is a personal computer with a high-speed Ethernet connection to hybrid terminal 110. When satellite gateway 160 receives a packet from hybrid gateway 150, it sends it over the satellite link.

Satellite communication may be effected by, for example, the Personal Earth Station designed and manufactured by Hughes Network Systems, Inc. In a preferred embodiment, a one-way version of the Personal Earth Station is used. Another embodiment uses a satellite communication system manufactured by Comstream. Yet another embodiment uses a system that allows hybrid terminal 110 to be connected directly to satellite receiver 180 via Hughes Network Systems' DirecPC product.

At the downlink, satellite receiver 180 includes a 0.6 meter receive-only antenna receiving HDLC encapsulated LAN packets. Satellite interface 120 includes rate 2/3 Viterbi/Reed-Soloman concatenated forward error correction.

Although only one hybrid terminal 110 and one application server 140 are shown in FIG. 1, the invention can include a plurality of hybrid terminals 110 and/or a plurality of application servers 140. Preferably, all packets sent from all application servers 140 to a hybrid interface 110 pass through a satellite gateway 160. Thus, satellite gateway 160 is a potential system bottleneck. Because of this potential bottleneck, the functions of satellite gateway 160 are as simple as possible and are performed as quickly as possible.

c. Protocol Spoofing

TCP/IP protocol specifies that only a predetermined number of packets can be outstanding during transmission, i.e., that only a limited number of packets can be sent before an ACK (acknowledgment) is received. The high bandwidth and long delays incurred in sending packets to an orbiting satellite and back means that at any given time, a large number of packets may be "in the pipe" between transmitter and receiver.

When using conventional TCP/IP protocol, application server 140 sends a predetermined number of packets in accordance with a predetermined window size, and then waits to receive ACKs over the modem link before sending additional packets. The purpose of windowing is to limit a number of packets that must be re-sent if no ACK is received and to provide flow control, e.g., to prevent sending packets faster than they can be received. The packets that have not been ACK'ed are stored in a memory so that they can be re-sent if no ACK is received.

In a preferred embodiment of the present invention, hybrid gateway 150 "spoofs" application server 140 to improve the throughput over the satellite link. Specifically, hybrid gateway 150 sends an ACK to application server 140, even though a corresponding packet may not have been received by hybrid terminal 110 via the satellite at the time.

Figure 12:
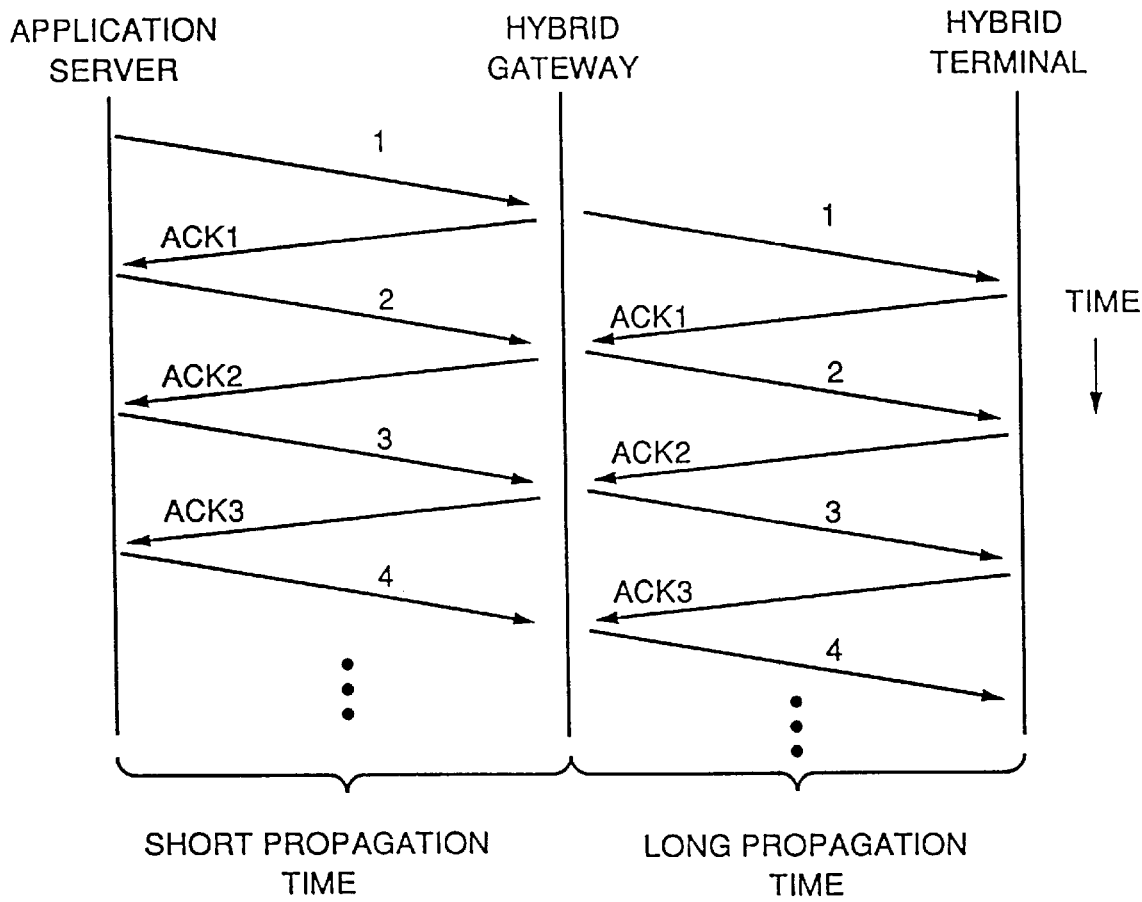
FIG. 12 is a ladder diagram showing packets sent from an application server to the hybrid gateway and from the hybrid gateway to the hybrid terminal over a satellite link.

FIG. 12 is a ladder diagram showing packets sent from application server 140 to hybrid gateway 150 and from hybrid gateway to hybrid terminal 110 through the satellite link. FIG. 12 is not drawn to scale. In FIG. 12, application server 140 sends a message #1 to hybrid gateway 150. The propagation time for this transmission is relatively short. Hybrid gateway 150 immediately creates an ACK packet and sends it to application server 140. Hybrid gateway 150 also sends packet #1 to hybrid terminal 110 through the satellite link. This transmission has a long propagation delay. When hybrid terminal 110 receives the packets, it sends an ACK #1 back to hybrid gateway 150 (e.g., using the tunneling mechanism described above). In a system that does not use tunneling, hybrid gateway 150 needs to intercept the ACK packet from hybrid terminal 110.

Figure 13A:
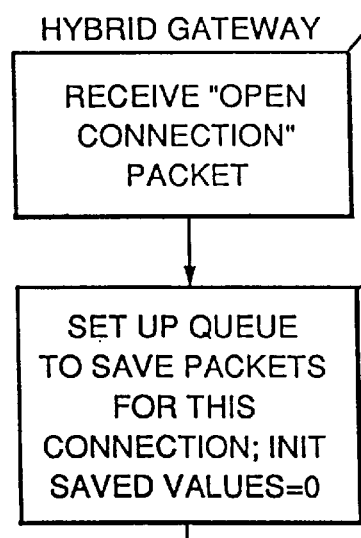
FIGS. 13(a) through 13(e) are flowcharts of steps performed by the hybrid gateway of FIG. 1.
Figure 13B:
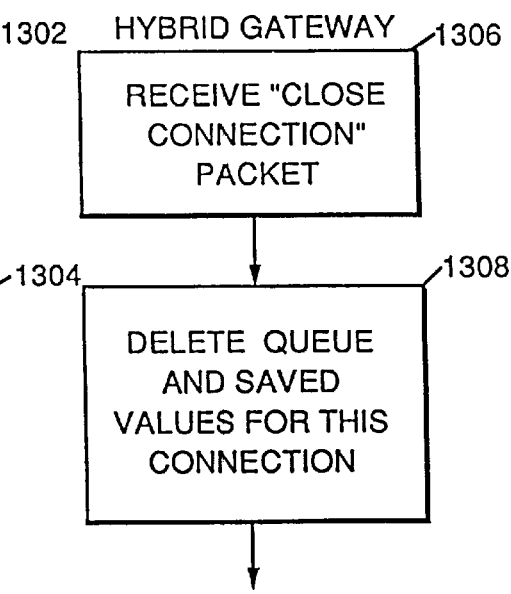

FIGS. 13(a) through 13(e) are flowcharts of steps performed by hybrid gateway 150 of FIG. 1 during protocol spoofing. In step 1302 of FIG. 13(a), hybrid gateway 150 receives a packet from application server 140 indicating that a new connection is being formed between application server 140 and hybrid terminal 110. In step 1304, hybrid gateway 150 sets up a queue or similar data structure in memory to save un-ACK'ed packets for the new connection. FIG. 13(b) shows corresponding steps performed by hybrid gateway 150 when the connection is closed. Hybrid gateway 150 receives a packet indicating the closure in step 1306 and deletes the queue and saved values for the connection in step 1308.

Figure 13C:
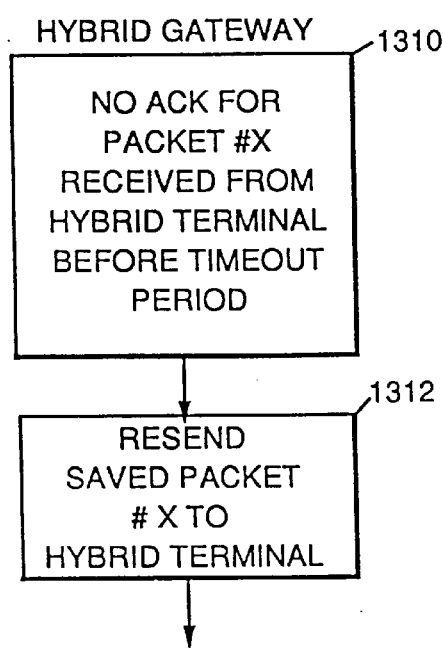

In step 1310 of FIG. 13(c), hybrid gateway 150 fails to receive an ACK for a packet number X from hybrid terminal 110 before an end of a predetermined timeout period. Hybrid gateway 150 maintains a timer for each un-ACK'ed packet. At the end of the predetermined period, hybrid gateway 150 retransmits a packet corresponding to the expired timer. In step 1312, hybrid gateway 150 resends packet number X, which it previously saved in the memory queue for this connection (see FIG. 13(d) below).

Figure 13D:
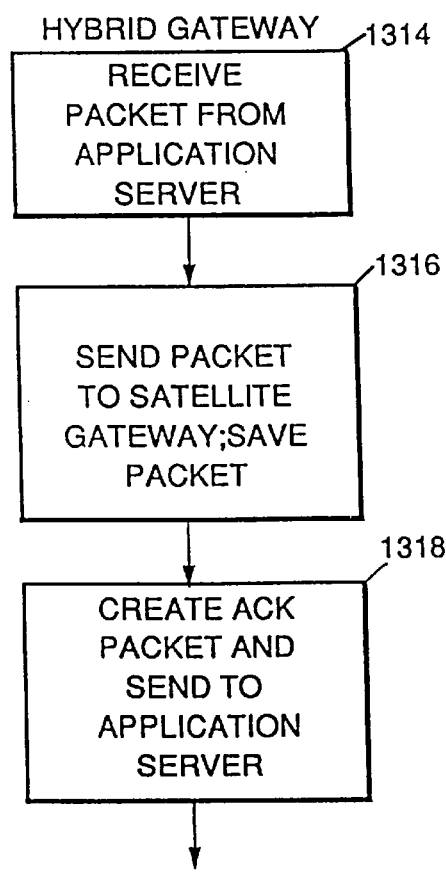

In step 1314 of FIG. 13(d), hybrid gateway 150 receives a packet from application server 140. In step 1316, hybrid gateway 150 sends the received packet to satellite gateway 160, where it is transmitted over the satellite link, and saves the packet in case it needs to be retransmitted (see FIG. 13(c)). Hybrid gateway 150 then creates an ACK packet to send to application server 140 in step 1318. The created ACK packet incorporates a format shown in FIG. 11. Hybrid gateway 150 creates an ACK number for field 1104. The ACK number is determined as follows:

Hybrid gateway 150 saves the following information for each connection:
1) Send sequence number—a highest in-sequence number of packets sent by application server 140 over the connection.
2) ACK sequence number—the ACK sequence number from the most recent packet sent by hybrid terminal 110 over this connection.
3) ACK window size—the window size from the most recent packet from hybrid terminal 110 over this connection.
4) ACK number—the ACK sequence number that is relayed to application server 140. The ACK number is set to: minimum (send sequence number, ACK sequence number+spoofed window size—ACK window size)
5) Spoofed window size—predetermined maximum number window size to be allowed on this connection.

When hybrid gateway 150 inserts the ACK number in the packet, it also calculates the packet's checksum 1106.

Figure 13E:
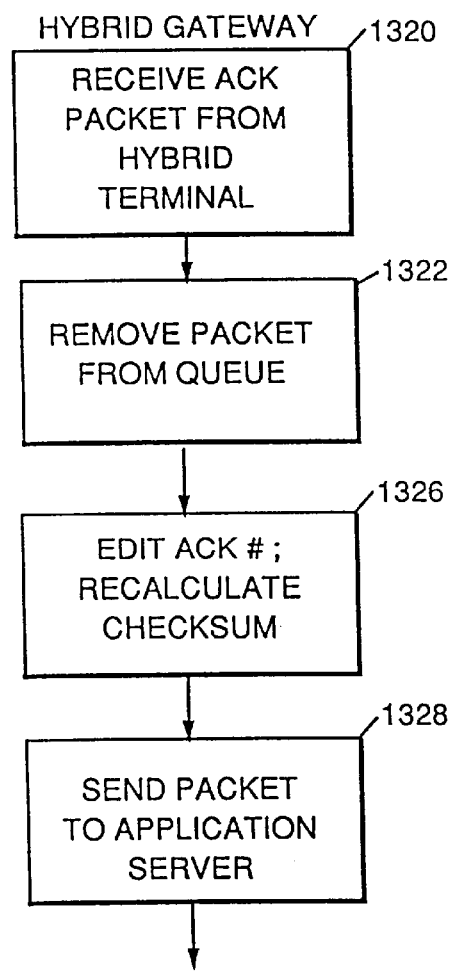

In step 1320 of FIG. 13(e), hybrid gateway 150 receives an ACK packet over the modem link from hybrid terminal 110. In step 1322, hybrid gateway 150 removes from the queue the packet for which the ACK was received. Because an ACK was received, the packet does not need to be re-sent. In the TCP/IP protocol, a packet containing an ACK may or may not contain data. Hybrid gateway 150 edits the received packet to replace the packet's ACK number 1104 with a "spoofed" ACK number in step 1326. The spoofed ACK number is determined in the same way as the ACK number in step 1318 of FIG. 13(d). When hybrid gateway 150 substitutes the spoofed ACK number 1104 in the packet, it also recalculates the packet's checksum 1106 in step 1326.

In step 1328, hybrid gateway 150 forwards the received ACK packet to application server 140. Application server 140 may simply disregard the packet if it contains an ACK and no data. In another embodiment, hybrid gateway 150 simply discards a packet received from hybrid terminal 110 that contains an ACK, but no data.

If the connection goes down, either explicitly or after a predetermined period of time, hybrid gateway 150 deletes the saved packets for the connection.

d. Summary

In summary, the present invention allows a personal computer to send messages into the Internet using a conventional dial-up link and to download data from the Internet using a high-speed one-way satellite link. In a preferred embodiment, the invention uses a conventional SLIP provider to connect to the Internet and uses a commercial software TCP/IP package that has a standard driver interface. A spoofing protocol compensates for the long propagation delays inherent to satellite communication.

II. SELECTIVE SATELLITE OR TERRESTRIAL LINK

According to a second embodiment of the present invention, information downloaded from the Internet may be selectively received via a high-speed link, or a lower speed link, such as a terrestrial link, as described in detail below. In a preferred embodiment, the high-speed link is a satellite link. It is understood, however, that other high speed links, such as cable television lines or the like, may be used. Similarly, the terrestrial link may be any low-speed network, such as a TCP/IP network, dial-up telephone, ISDN D-channel, or CPDP.

a. General Overview

As set forth above, the use of the satellite link to download information from the Internet has many advantages, such as high bandwidth capability. There may be some applications, however, when a user may prefer to use a terrestrial link, rather than a satellite link, to download information from the Internet. For example, because of the distance of the satellite from earth, the response time using a satellite link may be approximately 600 ms, as opposed to approximately 300 ms for a terrestrial link. Thus, in applications which are sensitive to response time, such as Telnet or domain name look-ups, a terrestrial link may be preferred.

Also, a user of the satellite link is generally charged based on the amount of time the satellite link is used. Thus, in order to control costs of the satellite link service, a user may prefer to use a terrestrial link for applications, such as Progressive Networks and Real Audio, where the high bandwidth and speed of the satellite link is not important but the amount of total traffic (measured in megabytes) is great.

Further, many Internet dial-up service providers offer value-added services (such as Usenet news or customer service evaluations) that are only accessible by their subscribers. Many of these providers verify that a user is a subscriber by checking the source IP address of the user's request. Because the satellite link effectively changes the source IP address of the request, the provider will not recognize the request and, consequently, the user may not be able to access the value-added services. Thus, a user may prefer to use a terrestrial link (which does not effect the source IP address) in order to access certain value-added services.

Therefore, the second embodiment of the present invention allows a user to selectively bypass the above-described satellite link and use a terrestrial link to retrieve information from the Internet.

b. Selecting the Terrestrial Link

Figure 14:
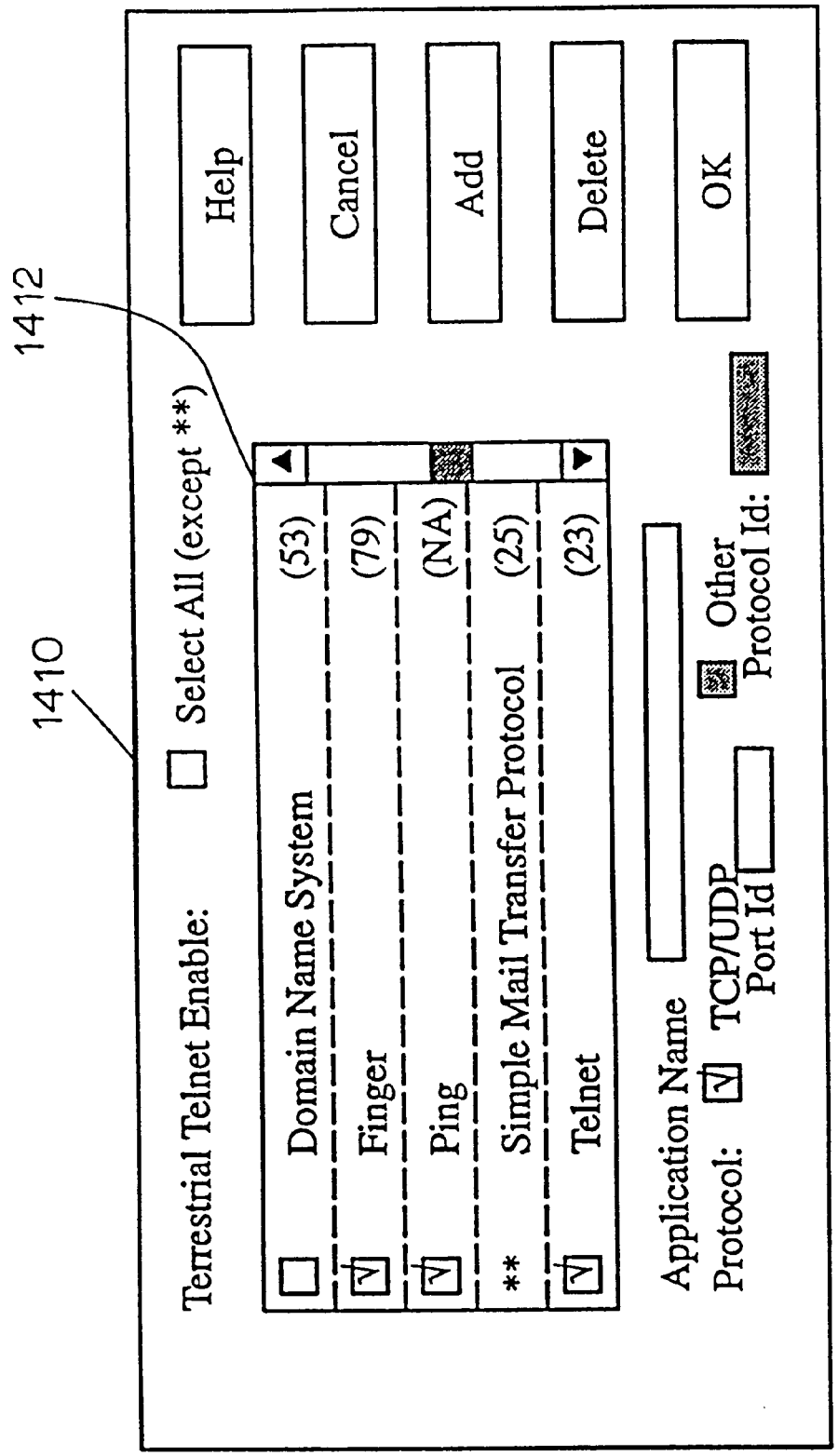
FIG. 14 is a diagram of an example of a graphical user interface which allows a user to select applications that will use a terrestrial link, rather than the satellite link, for downloading data.

In a preferred embodiment, the hybrid terminal 110 includes a graphical user interface (GUI) which allows a user to select a list of applications that will use the terrestrial link, rather than the satellite link, for retrieving information from the Internet 128. An example of a user interface 1410 is shown in FIG. 14. The interface 1410 allows a user to select which applications will use the terrestrial link (referred to hereafter as "terrestrial applications"). For example, applications such as Telnet, Finger and Ping, which require fast response time but low bandwidth, may be selected to use the terrestrial link. The hybrid terminal 110 may also be configured such that these applications (and/or other applications) are routed through the terrestrial link by default.

Each application is assigned a specific TCP/UDP (transmission control protocol/user datagram protocol) port number (designated by reference number 1412 in FIG. 14). For example, web browsing applications are assigned to port no. 80, telnet applications are assigned to port no. 23, etc. A user may select terrestrial applications by specifying the TCP/UDP port number (or another type of protocol identification number, if applicable) for the application. A user may change the list of selected terrestrial applications at any time.

Preferably, the graphical user interface of the hybrid terminal 110 also allows the user to designate one or more IP address ranges, when such address ranges can only be accessed terrestrially. For example, the designated address range could correspond to the addresses of the ISP value-added services. The hybrid terminal 110 would route any data packet with a destination address falling within a designated address range over the terrestrial link.

Preferably, even if an application was not prespecified by a user as a terrestrial application, a user may specify "on-the-fly" that all applications should be routed over the terrestrial link. This may be implemented, for example, by incorporating a pull-down menu in the user interface which allows a user to specify all applications as terrestrial. Once specified, all information retrieved from the Internet would be received over the terrestrial link until the user specifies that only the pre-selected applications should use the terrestrial link. A user may also be able to specify "on-the-fly" that a single application be routed over the terrestrial link.

Further, the hybrid terminal 110 could be modified to automatically select the terrestrial link if, for example, the satellite link malfunctions. The satellite receiver 180 is able to detect a loss of receive signal that may be caused, for example, by rain attenuation, antenna misalignment, system failures, etc. Upon detecting a failure in the satellite link, the hybrid terminal could automatically switch to the terrestrial link. Similarly, if the hybrid gateway 150 detects that the satellite link is congested or overloaded, it could route a portion of the data over the terrestrial link in order to relieve the congestion. Selected data packets received by the hybrid gateway for transmission over the satellite link could be modified and returned to the Internet for re-routing over the terrestrial link.

The selective satellite or terrestrial link also serves as a trouble shooting tool in the system. Thus, problems with the terrestrial link (such as with the dial-up TSP) can be isolated from the satellite service equipment. The satellite link may serve as a back-up if the terrestrial link fails, and vice versa.

c. The Terrestrial Link

Referring to the hardware diagram of FIG. 1, the subsystems for the second embodiment of the invention remain unchanged, except that the software in driver 114 in the hybrid terminal 110 is modified to allow for selective use of the satellite link or the terrestrial link to retrieve information from the Internet 128. (The modified driver will be referred to as driver 114A). The terrestrial link comprises the path from application server 140 to the Internet 128 to the serial port 122 in the hybrid terminal 110 via the SLIP provider 130 and the modem 190. The SLIP provider 130 may alternatively be a PPP (point to point protocol) provider.

Figure 15:
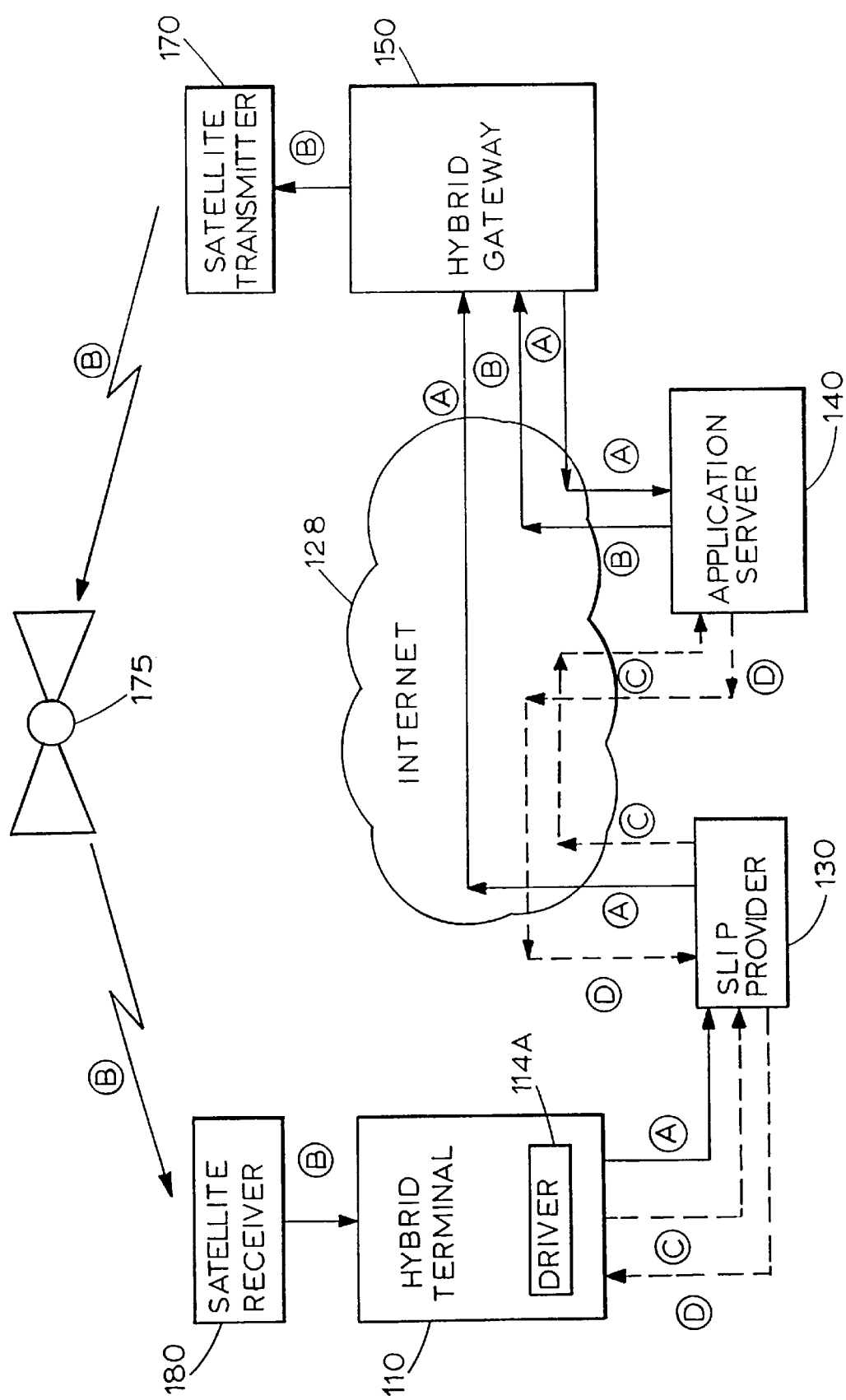
FIG. 15 is a simplified hardware block diagram of the present invention illustrating satellite and terrestrial request and reply paths.

FIG. 15 is a simplified hardware diagram of the present invention depicting the satellite and terrestrial paths for requesting and receiving information from the Internet 128.

The satellite request path for sending a request from the hybrid terminal 110 to the application server 140, wherein the response is to be returned via the satellite link, is shown by the solid arrows labeled "A". The satellite request path "A" originates with the hybrid terminal 110, which sends a data request packet via the SLIP provider. As described in detail above, the driver 114A in the hybrid terminal 110 "tunnels" the request packet such that the request packet is routed to the hybrid gateway 150 via the Internet 128. The hybrid gateway 150 "untunnels" the packet and sends it back to the Internet 128 for routing to the application server 140.

The satellite reply path for sending a reply from the application server 140 to the hybrid terminal 110 via the satellite link is shown by the solid arrows labeled "B" in FIG. 15. As explained in detail above, the application server 140 is "fooled" into sending reply packets to the hybrid terminal 110 through the hybrid gateway 150 and the satellite link, rather than returning the reply packets to the sender (i.e. SLIP provider 130).

The terrestrial request path for sending a request from the hybrid terminal 110 to the application server 140, wherein the response is to be returned via the terrestrial link, is shown by the dashed arrows labeled "C" in FIG. 15. Like the satellite request path "A", the hybrid terminal 110 sends a data request packet to the SLIP provider 130. Unlike the satellite request packet, however, the driver 114A does not tunnel the request packet to the hybrid gateway 150. Instead, in the terrestrial request path "C", the request is routed directly from the SLIP provider 130 to the application server 140 via the Internet 128.

The terrestrial reply path from the application server 140 to the hybrid terminal 110 via the terrestrial link is shown by the dashed arrows labeled "D" in FIG. 15. The terrestrial reply path "D" is the reverse of the terrestrial request path "C". Thus, the application server 140 sends the reply packets directly to the SLIP provider 130 via the Internet 128. The SLIP provider 130 then transmits the reply packets to the hybrid terminal 110.

d. Packet Handling for the Terrestrial Link

Figure 16:
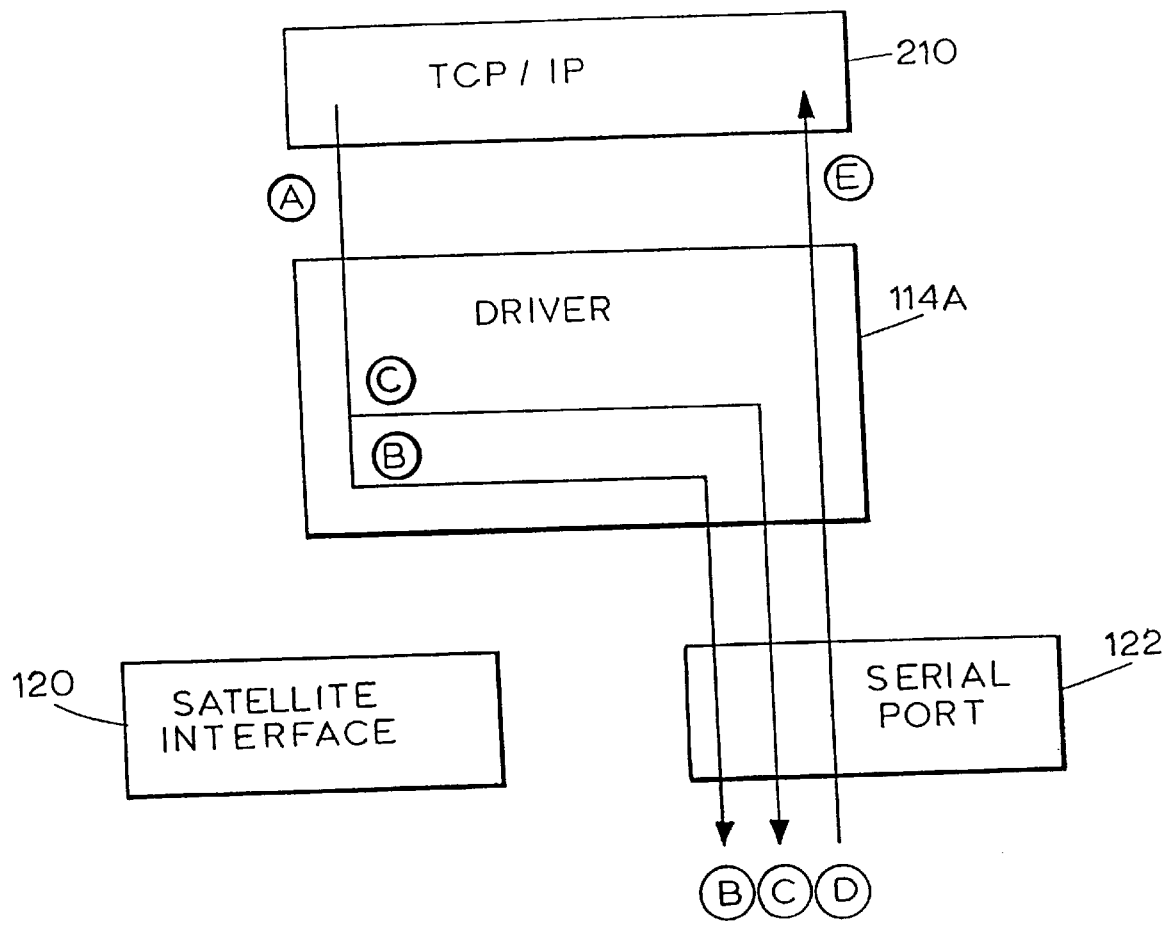
FIG. 16 is a block diagram illustrating the transfer of data packets between components of the hybrid terminal.

The following paragraphs describe how the request and reply packets are manipulated for transmitting packets via the terrestrial link. FIG. 16 is a simplified block diagram illustrating the relationship between the TCP/IP software 210 (included in application software 112), the software in the modified satellite/terrestrial driver 114A, the serial port 122, and the satellite interface 120 in the hybrid terminal 110.

As described in detail above, the TCP/IP software 210 generates a request packet and provides the request packet to the driver 114A. FIG. 16A is a simplified diagram of an original request packet sent from the TCP/IP software 210 to the driver 114A. Referring also to FIG. 16, the point "A" represents the original request packet shown in FIG. 16A. As explained in detail above, the original request packet generated by the TCP/IP software 210 has a destination address (DA) of the application server 140 and a source address (SA) of the satellite interface 120. The original request packet also includes an IP header checksum (the sum of the numbers making up the source and destination addresses) and a TCP/UDP checksum (the sum of the numbers making up the entire packet). The checksums are used to determine whether the packets have been accurately transmitted, without corruption of the addresses or data. The original request packet also includes the request data.

Also, as explained in detail above, if the request is to be returned via the satellite link (i.e. the user has not designated the application generating the request as a terrestrial application), the driver 114A "tunnels" the packet inside another packet and sends the tunneled packet over the serial port 122 to the SLIP provider 130. The tunneled packet, which is shown in FIG. 16B and represented by point "B" on FIG. 16, includes a new destination address corresponding to the hybrid gateway 150 and a new source address corresponding to the SLIP provider 130. The tunneled packet also includes a new IP header checksum corresponding to the new destination and source addresses. The remainder of the tunneled packet comprises the original request packet provided to the driver 114A from the TCP/IP software 210.

Alternatively, if the user has selected the application generating the request as a terrestrial application, the driver 114A does not "tunnel" the packet. Instead, as shown in FIG. 16C and represented by point "C" on FIG. 16, the driver 114A changes the source address of the original request packet from the satellite interface to the SLIP provider. The destination address (corresponding to the application server) and the request data remain the same as in the original packet. The IP header checksum and TCP/UDP checksum are also modified consistent with the change of the source address.

The terrestrial request packet of FIG. 16C is routed via the terrestrial request path (path "C" in FIG. 15). The SLIP provider 130 receives the packet from the serial port 122 and sends the packet to the destination address (i.e. the application server 140) via standard Internet routing. The application server 140, in turn, responds to the request by sending a terrestrial reply packet, as shown in FIG. 16D. The application server 140 addresses the reply packet to the source address of the request (i.e. the SLIP provider 130). Thus, the terrestrial reply packet from the application server 140 has a destination address corresponding to the SLIP provider 130 and a source address corresponding to the application server 140. The terrestrial reply packet also contains an appropriate IP header and TCP/UDP checksum and the reply data.

The terrestrial reply packet is sent from the application server 140 via standard Internet routing to the SLIP provider 130. The SLIP provider 130 then sends the reply packet to the serial port 122 in the hybrid terminal 110. The terrestrial reply packet provided to the serial port 122 is represented by point "D" on FIG. 16.

The driver 114A receives the terrestrial reply packet from the serial port 122 and modifies the reply packet by changing the destination address from the SLIP provider to the satellite interface, as shown in FIG. 16E. The driver 114A changes the destination address to the satellite interface because, as described in detail above, the TCP/IP software 210 is configured with an IP address corresponding to the satellite interface. Thus, the TCP/IP software will not recognize the terrestrial reply packet unless the reply packet includes the proper IP address of the satellite interface for the TCP/IP software. The driver 114A also changes the IP header checksum and the TCP/UDP checksum consistent with the new destination address. The modified terrestrial reply packet is represented by point "E" on FIG. 16.

e. Automatic Selection of the Terrestrial Link

As described above, the hybrid gateway 150 may automatically route applications over the terrestrial link if, for example, the satellite link becomes congested. The hydrid gateway 150 may also automatically select the terrestrial link if a "streaming" application is used. A streaming application is a continuously running application (such as audio, video, slide shows, etc.) as opposed to applications which run in segments or bursts (such as web browsing). Streaming applications generally occupy an inordinate share of the satellite link, which may become prohibitively expensive for the user. Therefore, the hybrid gateway 150 may be configured to automatically detect packets which are part of a streaming application and route them over the terrestrial link.

The hybrid gateway 150 may detect a streaming application for routing over the terrestrial link by examining the header on the data packet. Generally, UDP (user datagram protocol) packets are part of a streaming application. Thus, the hybrid gateway 150 could assume that all UDP packets are streaming applications and route them over the terrestrial link.

Alternatively, the hybrid gateway 150 could detect streaming applications by monitoring the traffic characteristics of TCP connections. Generally, streaming applications run for an extended period of time at a bit rate consistent with a conventional dial-up connection (i.e., under 30 Kbit/sec). Also, any connection which has carried more than, for example, 12 Megabytes may be assumed to be a streaming application. Thus, the hybrid gateway 150 could automatically route packets with these traffic characteristics over the terrestrial link.

As described in section (e) above, the hybrid gateway 150 could automatically route selected packets over the terrestrial link by changing the destination address of the packet to the SLIP provider and recalculating the IP header and TCP/UDP checksums accordingly. Thus, the hybrid gateway modifies the packet into a terrestrial reply packet as shown in FIG. 16D. This reply packet is then sent via standard Internet routing to the SLIP provider 130. The SLIP provider 130, in turn, sends the packet to the driver 114A in the hybrid terminal 110 via the serial port 122. The driver 114A receives the reply packet and changes the destination address to the satellite interface and recalculates the checksums, as described above in connection with FIG. 16E.

f. Summary

The second embodiment of the invention allows a user to specify that certain applications will retrieve data from the Internet over the terrestrial link, rather than over the satellite link. Generally, a user may prefer to use the terrestrial link for applications (such as Telnet) that require faster response time. The user may also select the terrestrial link to control costs associated with the satellite link or to access certain value-added services. The hybrid gateway may also automatically select certain applications such as streaming applications, to be routed over the terrestrial link. Data is routed over the terrestrial link by modifying the IP addresses of data packets in the hybrid terminal.

Other embodiments of the invention will be apparent to those skilled in the art from consideration of the specification and practice of the invention disclosed herein. It is intended that the specification and examples be considered as exemplary only, with the true scope of the invention being indicated by the following claims.

We claim:

1. A system for retrieving data from a source computer coupled to a network, comprising:
    a low-speed path linking a requesting terminal with the network;
    a high-speed path linking the requesting terminal with the network; and
    selection means for selecting one of the low-speed path and the high-speed path for transmission of data from the source computer to the requesting terminal, said selection means sending a request over the low-speed path including a selection of whether the source computer should transmit the data from the source computer to the requesting terminal using the low-speed path or the high-speed path.

2. The system of claim 1, wherein the low-speed path comprises a terrestrial link.

3. The system of claim 2, wherein the terrestrial link comprises a serial port in the requesting terminal in communication with a PPP provider connected to the network.

4. The system of claim 3, wherein the serial port communicates with the PPP provider via a modem.

5. The system of claim 1, wherein the low-speed path comprises a two-way link between the requesting terminal and the network.

6. The system of claim 1, wherein the requesting terminal requests data from the source computer via the low-speed path.

7. The system of claim 1, wherein the high-speed path comprises a satellite link.

8. The system of claim 1, wherein the high-speed path comprises a one-way link from the source computer to the requesting terminal.

9. The system of claim 1, wherein the high-speed path comprises a gateway connected to the network and data retrieved from the source computer is provided to the gateway via the network and transmitted to the requesting terminal via a satellite link.

10. The system of claim 1, wherein the requesting terminal includes application software for generating a data request packet for transmission from the requesting terminal to the source computer.

11. The system of claim 10, wherein the selection means comprises a driver for receiving the data request packet from the application software and modifying the request packet to specify one of the low-speed path and the high-speed path for transmission of data from the source computer.

12. A system for retrieving data from a source computer coupled to a network, comprising:
    a requesting terminal for requesting data to be retrieved from the source computer, wherein the requesting terminal includes (a) a terrestrial interface coupled to the network, (b) a satellite interface capable of receiving data transmitted via a satellite link, wherein the satellite link is coupled to the network, and (c) means for designating that the requested data be transmitted from the source computer to the requesting terminal through one of the terrestrial interface and the satellite interface, said designating means sending a request through the terrestrial interface including a designation of whether the source computer should transmit the data from the source computer to the requesting terminal through the terrestrial interface or the satellite interface.

13. The system of claim 12, wherein the requesting terminal transmits a request packet to the source computer through the terrestrial interface.

14. The system of claim 13, wherein the request packet includes a destination address corresponding to the source computer and a source address corresponding to the satellite interface.

15. The system of claim 13, wherein the designating means comprises a driver that modifies the request packet to specify one of the terrestrial interface and the satellite interface.

16. A method of retrieving data from a source computer coupled to a network, comprising the steps of:
    generating, at a requesting terminal, a request packet for transmission of data from the source computer;
    designating, at the requesting terminal, a transmission path selected from one of a low-speed path and a high-speed path for transmission of the requested data from the source computer to the requesting terminal;

providing the designated data request packet to the source computer via the low-speed path, the designated data request packet including a designation of whether the source computer should transmit the requested data from the source computer to the requesting terminal through the low-speed path or the high-speed path, wherein the source computer generates a data reply; and receiving the data reply from the source computer via the designated transmission path.

17. The method of claim 16, wherein the step of designating a transmission path further comprises the step of modifying the request packet.

18. The method of claim 16, wherein the low-speed path comprises a terrestrial link and the high-speed path comprises a satellite link.

19. The method of claim 18, wherein the requesting terminal provides the designated data request to the source computer via the terrestrial link.

20. The method of claim 18, wherein the step of designating the transmission path further comprises the step of specifying an application to use one of the terrestrial path or the satellite path.

21. The method of claim 18, wherein the terrestrial link comprises:

a link between the requesting terminal and a PPP provider;

a link between the PPP provider and the network; and a link between the network and the source computer.

22. The method of claim 18, wherein the satellite link comprises:

a link between the source computer and the network;

a link between the network and a gateway; and a satellite connection between the gateway and the requesting terminal.

23. A system for retrieving data from a source computer coupled to a network, comprising:

a two-way, low-speed terrestrial path linking a requesting terminal with the network;

a one-way, high-speed satellite path linking the requesting terminal with the network; and selection means for selecting one of the terrestrial path and the satellite path for transmission of data from the source computer to the requesting terminal, said selection means sending a request over the low-speed terrestrial path including a selection of whether the source computer should transmit the data from the source computer to the requesting terminal using the low-speed terrestrial path or the high-speed satellite path.

24. A system for retrieving data from a source computer coupled to a network, comprising:

a low-speed path linking a requesting terminal with the network;

a high-speed path linking the requesting terminal with the network; and selection means for selecting one of the low-speed path and the high-speed path for transmission of data from the source computer to the requesting terminal, wherein the requesting terminal includes application software for generating a data request packet for transmission from the requesting terminal to the source computer, wherein the selection means comprises a driver for receiving the data request packet from the application software and modifying the request packet to specify one of the low-speed path and the high-speed path for transmission of data from the source computer, and wherein the request packet is an IP packet including a destination address and a source address and the driver specifies the high-speed path by tunneling the packet.

25. A system for retrieving data from a source computer coupled to a network, comprising:

a low-speed path linking a requesting terminal with the network;

a high-speed path linking the requesting terminal with the network; and selection means for selecting one of the low-speed path and the high-speed path for transmission of data from the source computer to the requesting terminal, wherein the requesting terminal includes application software for generating a data request packet for transmission from the requesting terminal to the source computer, wherein the selection means comprises (a) a driver for receiving the data request packet from the application software and modifying the request packet to specify one of the low-speed path and the high-speed path for transmission of data from the source computer, and (b) a user interface in the requesting terminal that allows a user to specify an application to use the low-speed path.

26. A system for retrieving data from a source computer coupled to a network, comprising:

a requesting terminal for requesting data to be retrieved from the source computer, wherein the requesting terminal includes (a) a terrestrial interface coupled to the network, (b) a satellite interface capable of receiving data transmitted via a satellite link, wherein the satellite link is coupled to the network, and (c) means for designating that the requested data be transmitted from the source computer to the requesting terminal through one of the terrestrial interface and the satellite interface, wherein the requesting terminal transmits a request packet to the source computer through the terrestrial interface, wherein the designating means comprises a driver that modifies the request packet to specify one of the terrestrial interface and the satellite interface, and wherein the driver specifies the satellite interface by adding a new destination address corresponding to the gateway and a new source address corresponding to the terrestrial interface to the request packet.

27. A system for retrieving data from a source computer coupled to a network, comprising:

a requesting terminal for requesting data to be retrieved from the source computer, wherein the requesting terminal includes (a) a terrestrial interface coupled to the network, (b) a satellite interface capable of receiving data transmitted via a satellite link, wherein the satellite link is coupled to the network, and (c) means for designating that the requested data be transmitted from the source computer to the requesting terminal through one of the terrestrial interface and the satellite interface, wherein the requesting terminal transmits a request packet to the source computer through the terrestrial interface, and wherein the designating means automatically designates that the requested data be transmitted through the terrestrial interface when the request packet corresponds to a streaming application.

28. A system for retrieving data from a source computer coupled to a network, comprising:

a requesting terminal for requesting data to be retrieved from the source computer, wherein the requesting terminal includes (a) a terrestrial interface coupled to the network, (b) a satellite interface capable of receiving data transmitted via a satellite link, wherein the satellite link is coupled to the network, and (c) means for designating that the requested data be transmitted from the source computer to the requesting terminal through one of the terrestrial interface and the satellite interface, wherein the designating means automatically designates that the requested data be transmitted through the terrestrial interface when the satellite link malfunctions.

29. A system for retrieving data from a source computer coupled to a network, comprising:

a requesting terminal for requesting data to be retrieved from the source computer, wherein the requesting terminal includes (a) a terrestrial interface coupled to the network, (b) a satellite interface capable of receiving data transmitted via a satellite link, wherein the satellite link is coupled to the network, and (c) means for designating that the requested data be transmitted from the source computer to the requesting terminal through one of the terrestrial interface and the satellite interface, wherein the designating means automatically designates that the requested data be transmitted through the terrestrial interface when the satellite link is congested.

\* \* \* \* \*